United States Patent [19]

Dudzik et al.

[11] Patent Number: 5,581,684
[45] Date of Patent: Dec. 3, 1996

[54] APPLICATION-EXTERNAL HELP SYSTEM FOR A WINDOWING USER INTERFACE

[75] Inventors: Dominic E. Dudzik, Paris; Marc L. Bucheron, Voisins, both of France; Jasper Verhoeff, Le Mesnil St. Denis, Netherlands

[73] Assignee: ddtec SA, Trappes, France

[21] Appl. No.: 287,943

[22] Filed: Aug. 9, 1994

Related U.S. Application Data

[63] Continuation of Ser. No. 283,706, Aug. 1, 1994.
[51] Int. Cl.[6] .................................................. G06F 3/14
[52] U.S. Cl. ......................... 395/338; 395/340; 395/326
[58] Field of Search .................................. 395/156, 155, 395/157, 158, 159, 161, 164, 700, 575, 650

[56] References Cited

U.S. PATENT DOCUMENTS

| | | | |
|---|---|---|---|
| 5,179,654 | 1/1993 | Richards et al. | 395/157 |
| 5,339,392 | 8/1994 | Risberg et al. | 395/161 |
| 5,349,657 | 9/1994 | Lee | 395/650 |
| 5,371,851 | 12/1994 | Pieper et al. | 395/164 |
| 5,421,004 | 5/1995 | Carpenter et al. | 395/575 |

Primary Examiner—Mark R. Powell
Assistant Examiner—Ruay Lian Ho
Attorney, Agent, or Firm—Charles J. Kulas; Philip H. Albert; Townsend and Townsend and Crew LLP

[57] ABSTRACT

Context sensitive help is provided by an application-external help system for a windowing environment. The help system is application-external in that it operates without the cooperation of an application or the help system supplied as part of the application. An object about which help is desired is selected by a user during the course of operation of an application program, and the help system uniquely identifies the object so that the help system can take appropriate action. Objects are uniquely identified by storing characteristics of each object, such as title, class, ID, style, number of child objects, number of parent objects, etc. An agent list contains, for each agent on the list, an event, an object string (including characteristics for each object) and an action. The help system also allows generalized functionality to be added to existing application programs by using script files that specify events to be performed on objects, by having a controller intercept communications to or from application programs and monitoring events. When certain events are detected, the help system inhibits and controls functions in the host application program to achieve added functionality.

16 Claims, 12 Drawing Sheets

APPLICATION-EXTERNAL HELP SYSTEM FOR A WINDOWING USER INTERFACE

This is a continuation of application Ser. No. 08/283,706 filed Aug. 1, 1994.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention relates generally to the identification of screen objects by an analysis of their characteristics in a computer graphical user interface and specifically to the identification of screen objects for purposes of implementing a help system in a computer providing a windows environment.

Today's computer systems typically provide a graphical user interface (GUI) that allows a user to operate the computer system by using a pointing device such as a mouse to control a pointer on the screen to select and activate objects corresponding to the images. The images, or objects, on the screen can be controls such as a button, slider or scroll bar; an icon corresponding to a program or file; a tool, utility or other mechanism that facilitates the user's operation of the computer system such as a window, etc. Thus, in a typical GUI, each object capable of manipulation has an associated object image that is displayed on the screen and which the user can select and activate by means of the mouse and pointer.

The selection and activation of the various objects allows the user to accomplish a variety of tasks such as operating application programs or invoking operating system commands. Most popular GUIs provide a windows environment where application programs are executed within one or more windows on the screen. Each window is a rectangular area on the screen that can be repositioned, resized, opened, closed, etc., in any a variety of well-known ways.

One popular type of windows environment is Microsoft Windows (MSW) by Microsoft Inc. The MSW environment has become quite popular as the environment of choice on many personal computer systems. For ease of discussion the invention is discussed below in relation to Microsoft Windows. However, any suitable windows environment such as the Macintosh Operating System by Apple Computers, Inc. is suitable for use with the present invention.

One feature of Microsoft Windows is that an automated help system is provided. The help system allows a user to receive information about objects on the screen or access general topics of interest in operating a given application. A user of the help system is allowed to select among topics and obtain help information on the topic (topic help). Other systems allow a user to obtain short one or two lines of help information (short help) on specific topics or objects. A convenient way to access the topic or short help is by pointing to objects with the mouse and pointer in order to obtain "context sensitive" help.

Context sensitive help is especially useful to a user who is first becoming acquainted with the operation of an application program. By using context sensitive help, the user selects a predetermined key sequence such as the key sequence CTRL-F1 when the pointer on the screen is overlapping (or "focused on") a specific object. The help system then provides informative text on the object by accessing a help text file that is associated with the application program. To the end user, the operation of the help system is easy and efficient. However, the creation of the help text and association of the help text with objects in a given application program is performed by a programmer/developer at some time prior to the user's help session. Currently, the development of help text and the association of the help text with objects is a burdensome procedure.

One severe drawback of the current help text development systems is that the help text developer must have access to a given application program's source code in order to associate help text with the various objects within the application program. This means that the help text developer must work with the application programmer in order to place associations between objects and help text. Not only does this make it very difficult to coordinate the development of help text while an application program is under development, but it makes it impossible to create specific help text for already existing applications since most applications are created by third party software developers and are shipped only as executable objects without the source code. Thus, it is impossible for a help text developer to create new and customized help text for existing applications.

FIG. 1 shows the prior art help system. In FIG. 1, application source code 10 is the starting point for associating context numbers with objects in the application program. For each specific application program there is a different associated source code from which the application program executable is derived. Certain statements within application source code 10, such as the instruction at 22 are "calls" to functions in the MSW environment. The MSW environment is shown symbolically as MSW process 16 in FIG. 1. An example of such a function call is "Win Help (...Context # ...)" shown at 22. In practice, the label "Context #" is replaced with a value, or named constant, that corresponds to a topic within help resource file 20.

Application source code 10 is compiled via compiler 12 to produce an application executable 14. Application executable 14 is executed by the processor within MSW environment 16. MSW environment 16 accepts user input signals that trigger the WinHelp call. A message about the signals is sent to Surveillance Motor 30 which invokes windows help engine 18. Windows help engine 18 accesses help resource file 20 in order to display and process help text dealing with the topic or object referred to by the context number.

A further description of prior art help text development systems can be found in "Borland C++ Tools and Utilities Guide, Version 3.1," Chapter 7, by Borland International Inc. 1992. A description of a user interface for a help text development system is also discussed in manuals on "Help Maker" by ddtec SA. For a general discussion of the Microsoft Windows Application Program Interface (API) see references such as "Programming Windows 3.1" or "Windows 3.1 Software Development Kit," by Microsoft Press.

As mentioned above, prior art help text development systems such as the one described in FIG. 1 do not allow a help text developer to work independently with the help resource file without the source code for the application for which help text is being written. This inconvenience adds to the cost and time required to make good help text systems and makes it impossible for a third party to add help text to an existing application executable. Another problem with traditional help text development systems is that they do not allow increased flexibility in providing help to the user beyond displaying text.

SUMMARY OF THE INVENTION

The present invention separates the task of developing an application from the task of developing a help system for that application. The invention intercepts messages and function calls at the operating system or environment level and allows a help system to be used with an application program executable without requiring recompilation of the application program's source code. The present invention provides further help features to the user beyond mere presentation of text, in that application programs of interest to the user can be controlled by the help system. The help system of the present invention also allows other application programs to be launched to aid the user in understanding the operation of the application program of interest. Several applications can be controlled by the help system to work in coordination with each other to provide help to the user or to achieve other functions.

In one embodiment of the invention a method is provided for implementing context sensitive help text in the computer system operated by the user. The computer system includes a processor, a memory, user input device and display screen. The computer system further includes an operating system and an application program wherein the display screen includes one or more images. Each image corresponds to an object identified either by (1) the operating system by an identification number ("ID") in which case various characteristics associated with an object can be obtained by using the object's ID, or (2) by the application generating the image in which case the invention uses other ways to obtain identification, such as by subclassing as described below.

An object image is selectable by the user using the user input device in a predetermined manner. The operating system sends communications to the application program when the user selects an object. The communication includes the object's characteristics. The memory of the computer system includes a list of objects and their characteristics where a given object in the list is associated with given help text. The method comprises the following steps executed by the processor: intercepting a communication passed between the operating system and the application program; determining that the object characteristics in the intercepted communication match the characteristics of an object in the list of object characteristics; and displaying, in response to the determining step, the first help text on the display screen.

DESCRIPTION OF THE PREFERRED EMBODIMENT

Appendix A to this specification contains source code for specific routines used to implement the methods of the present invention. The source code and data structures are written in the computer programming language Turbo Pascal, by Borland, Inc. The source code of Appendix A should be consulted for specific details of the methods of the present invention in connection with the discussion below.

Figure 1:
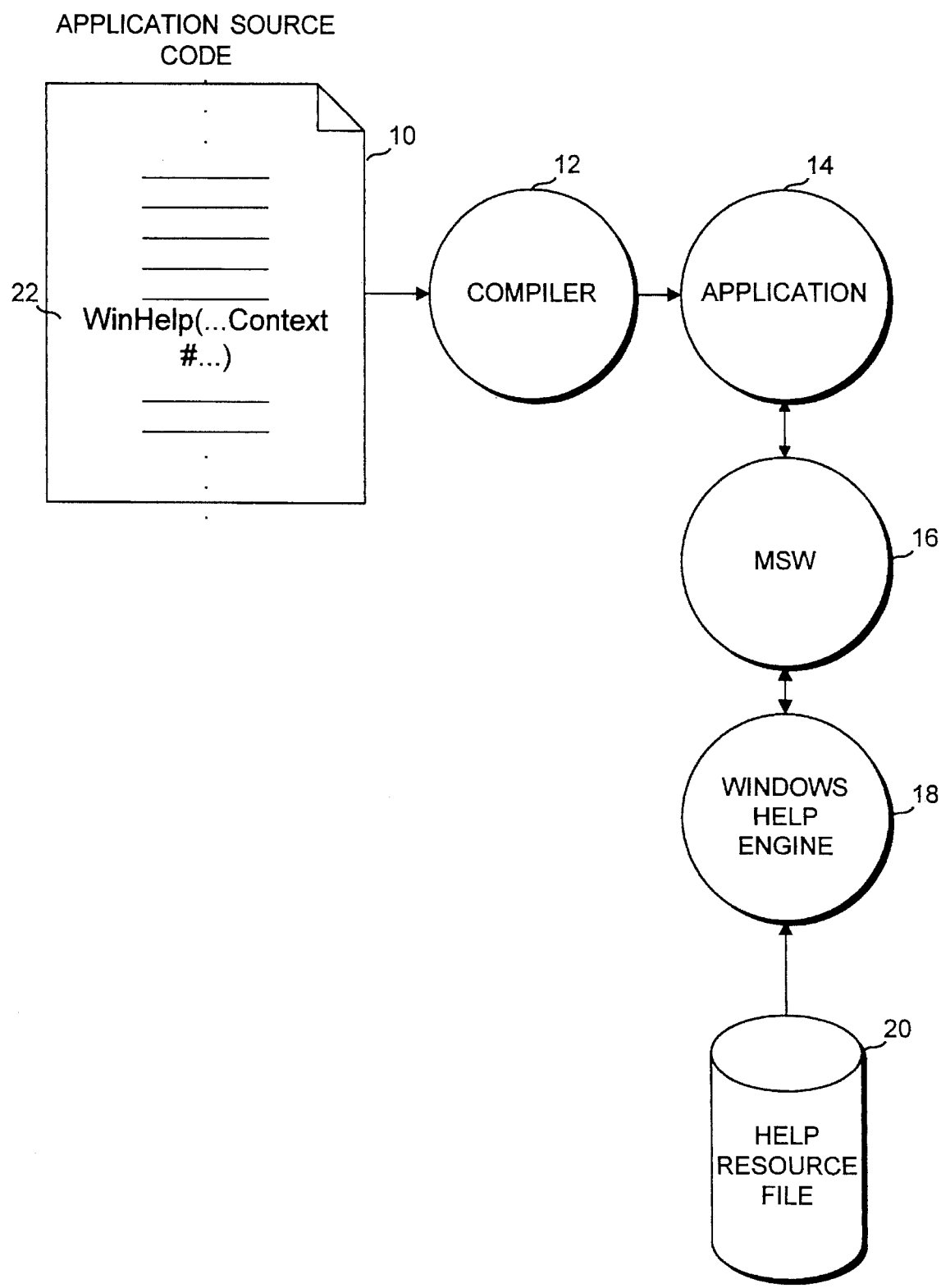
FIG. 1 is an illustration of a prior art help text development system.
Figure 2:
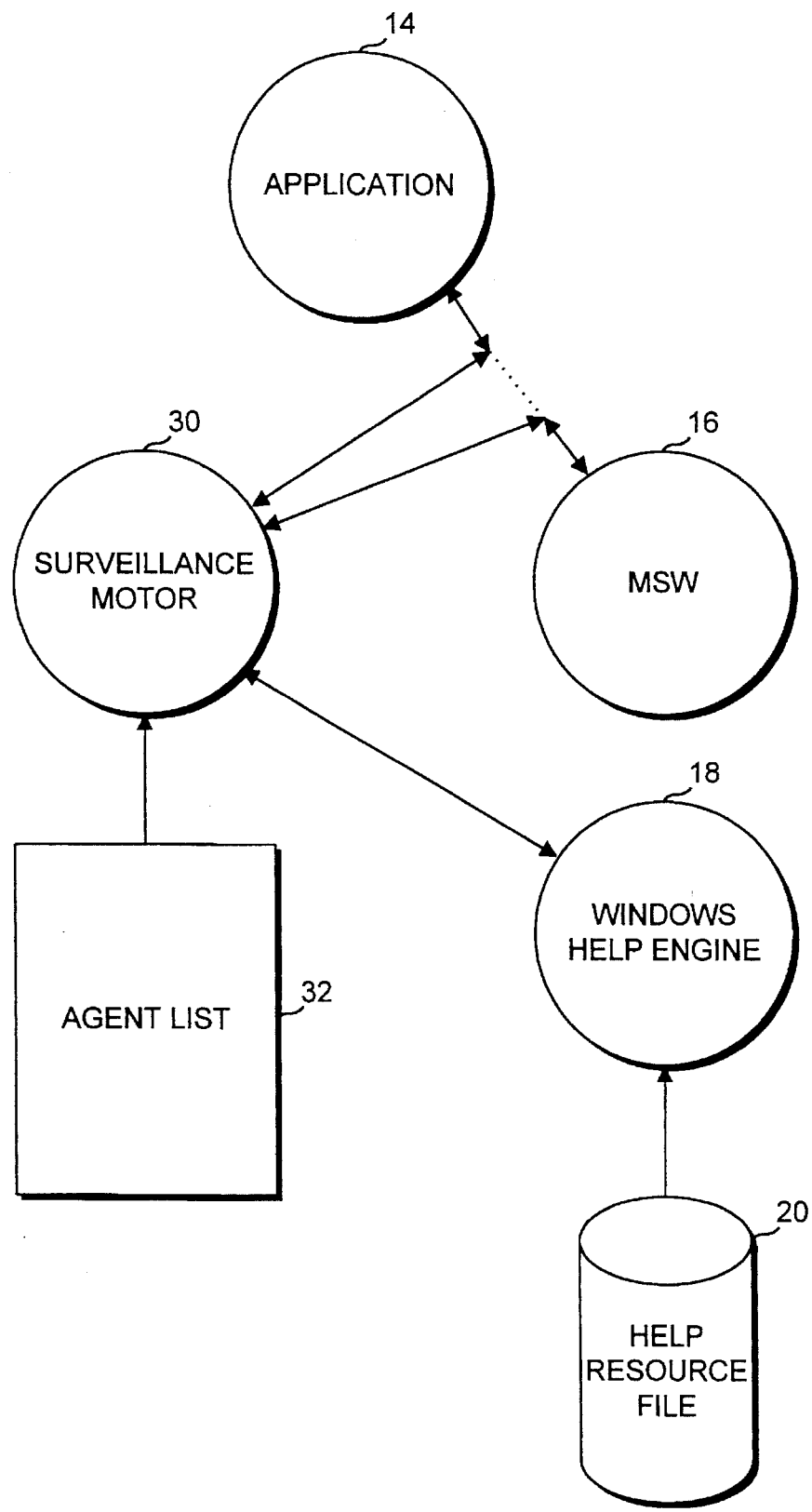
FIG. 2 is an illustration of a help text development system according to the present invention.

FIG. 2 shows the diagram of FIG. 1 modified to reflect the help text development system of the present invention. While the method of the invention for identifying screen objects by analyzing their characteristics is adaptable for use in many applications a preferred embodiment applies the identification method to a help text development system running under Microsoft Windows. The discussion in this specification describes the help text development system application of the invention in detail and describes the more general application of the invention to controlling third party software where appropriate.

In FIG. 2, software processes are shown as circles or ovals while data files are shown as rectangular boxes. Thus, FIG. 2 shows application 14 no longer in direct communication with Microsoft Windows environment 16. In general, use of the same reference number between different figures indicates the same item.

Surveillance motor 30 of FIG. 2 intercepts messages and operating system function calls (collectively called "communications") between application 14 and MSW 16. In operation, surveillance motor 30 passes many of the messages without performing an action based on the messages or otherwise affecting the messages. However, when surveillance motor 30 detects a message indicating an event designated to trigger an action (such as displaying help text) surveillance motor 30 prevents the message from being acted on directly by MSW 16. Instead, surveillance motor 30 determines which object in application 14 is the focus of the pointer at the moment the user has requested help. That is, surveillance motor 30 determines which object image on the screen the user is pointing to, selecting or activating and assumes, in context help mode, that the object being focused on is the object for which the user desires help information.

Surveillance motor 30 accesses agent list 32 which contains object strings and events. Each of the agents may include a "link" to help resource file 20. Agent list 32 includes a list of triggering events and is discussed in more detail below. If the object focused on is in agent list 32 surveillance motor 30 posts a message specifying that the action belonging to this agent is to be performed. In the case of a help action the link name is passed to Windows Help Engine 18 (e.g., for topic help). Windows help engine 18 then accesses the proper topic from help resource file 20 and displays the information to the user. Alternatively, a short form of help text may be directly displayed by surveillance motor 30 in the title bar or a pop-up window, for example.

Several enhancements to the general help system of FIG. 2 are discussed below, but first a discussion of the hardware used to execute the methods of the present invention is presented.

Figure 3:
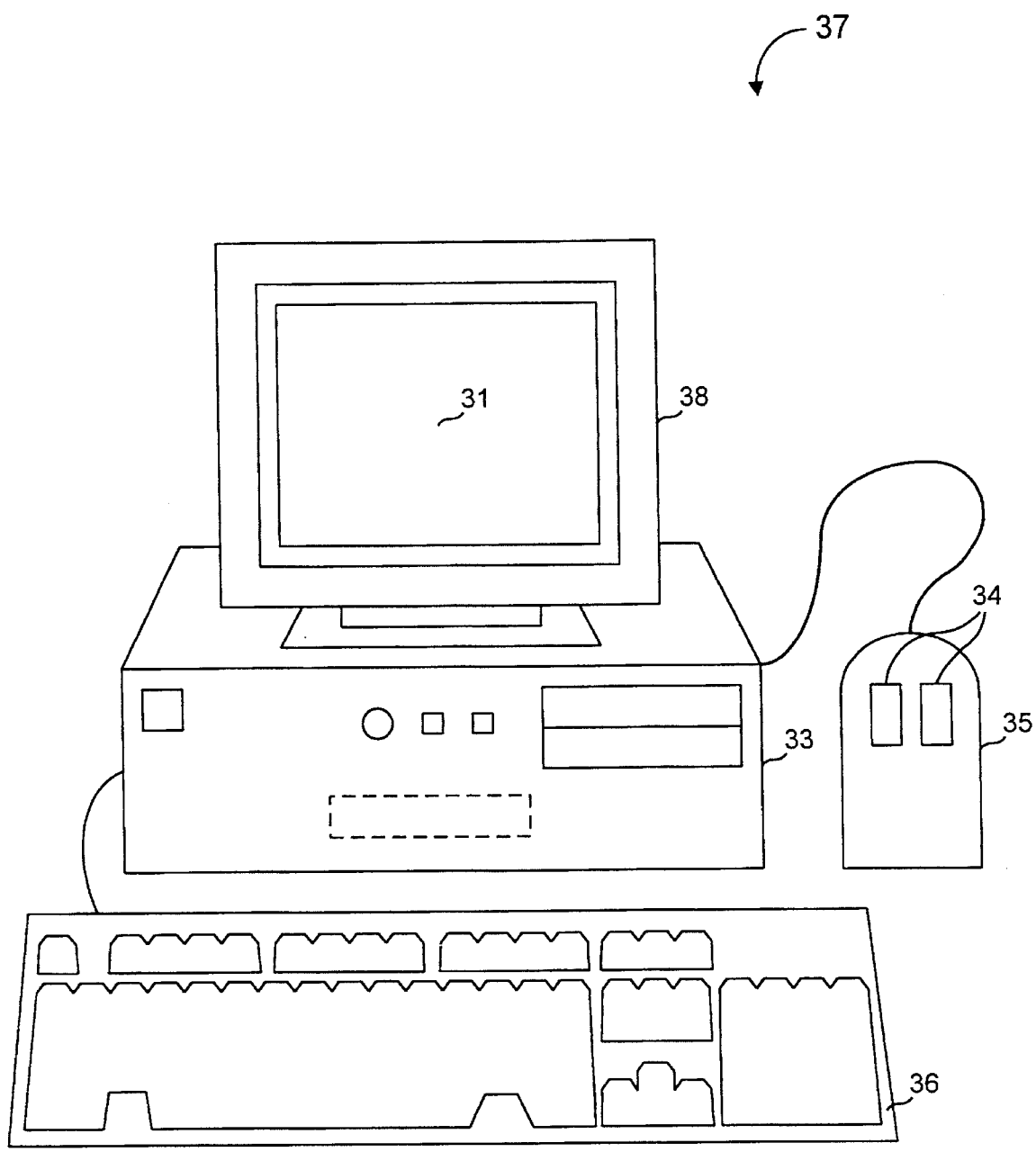
FIG. 3 is an illustration of a computer system suitable for use with the present invention.

FIG. 3 is an illustration of a computer system suitable for use with the present invention. FIG. 3 depicts but one example of many possible computer types or configurations capable of being used with the present invention. FIG. 3 shows computer system 37 including display device 38, display screen 31, cabinet 33, keyboard 36 and mouse 35. Mouse 35 and keyboard 36 are "user input devices." Other examples of user input devices are a touch screen, light pen, track ball, data glove, etc.

Mouse 35 may have one or more buttons such as buttons 34 shown in FIG. 3. Cabinet 33 houses familiar computer components such as disk drives, a processor, storage means, etc. As used in this specification "storage means" includes any storage device used in connection with a computer system such as disk drives, magnetic tape, solid state memory, bubble memory, etc. Cabinet 33 may include additional hardware such as input/output (I/O) interface cards for connecting computer system 37 to external devices such as an optical character reader, external storage devices, other computers or additional devices.

Figure 4:
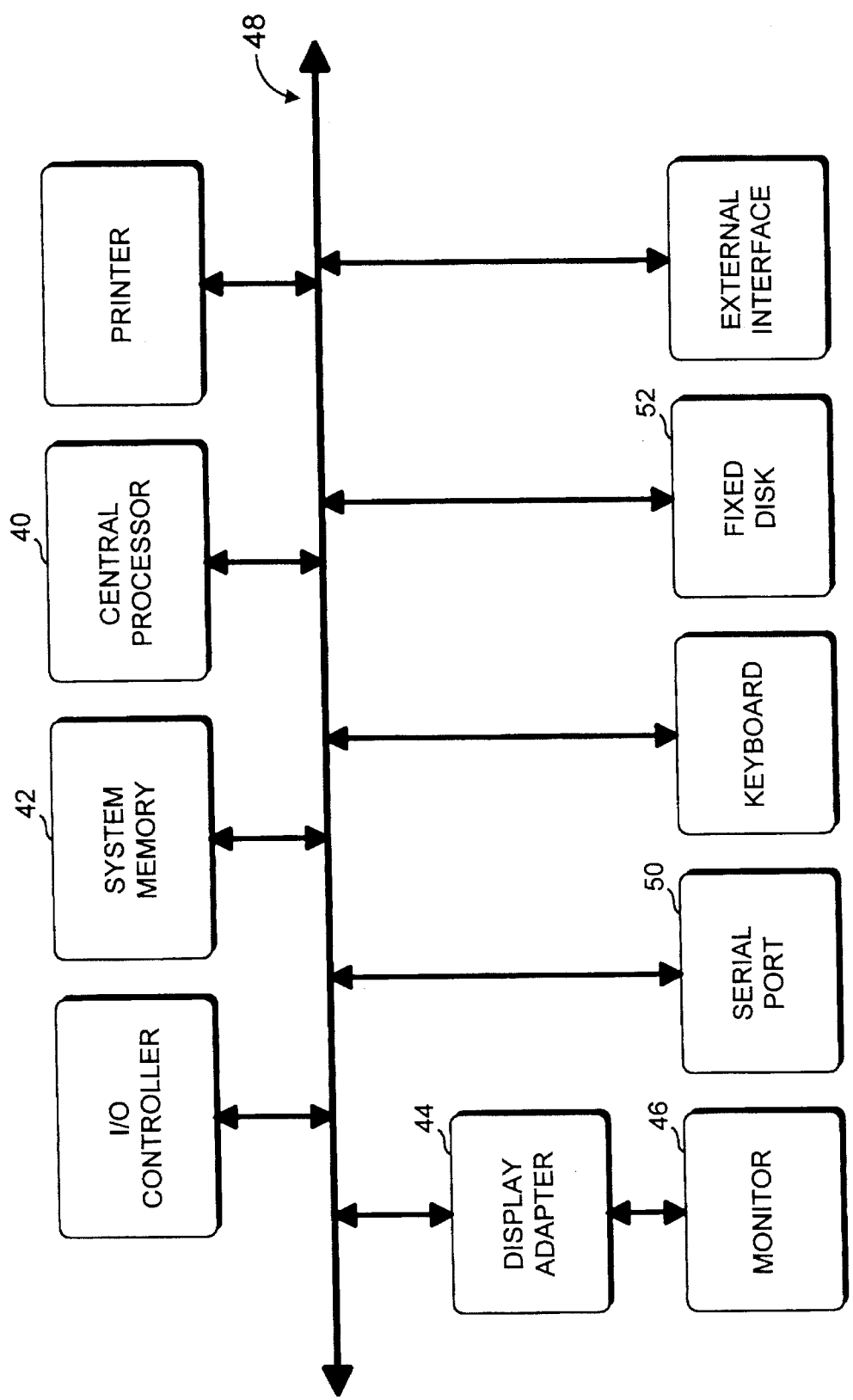
FIG. 4 is an illustration of basic subsystems in the computer system of FIG. 3.

FIG. 4 is an illustration of basic subsystems in computer system 37 of FIG. 3. In FIG. 4, subsystems are represented by blocks such as central processor 40, system memory 42, display adapter 44, monitor 46, etc. The subsystems are interconnected via a system bus 48. Additional subsystems such as a printer, keyboard, fixed disk and others are shown. Peripherals and input/output (I/O) devices can be connected to the computer system by, for example serial port 50. For example, serial port 50 can be used to connect the computer system to a modem or mouse input device. The interconnection via system bus 48 allows central processor 40 to communicate with each subsystem and to control the execution of instructions from system memory 42 or fixed disk 52, and the exchange of information between subsystems. Other arrangements of subsystems and interconnections are possible.

Figure 5:
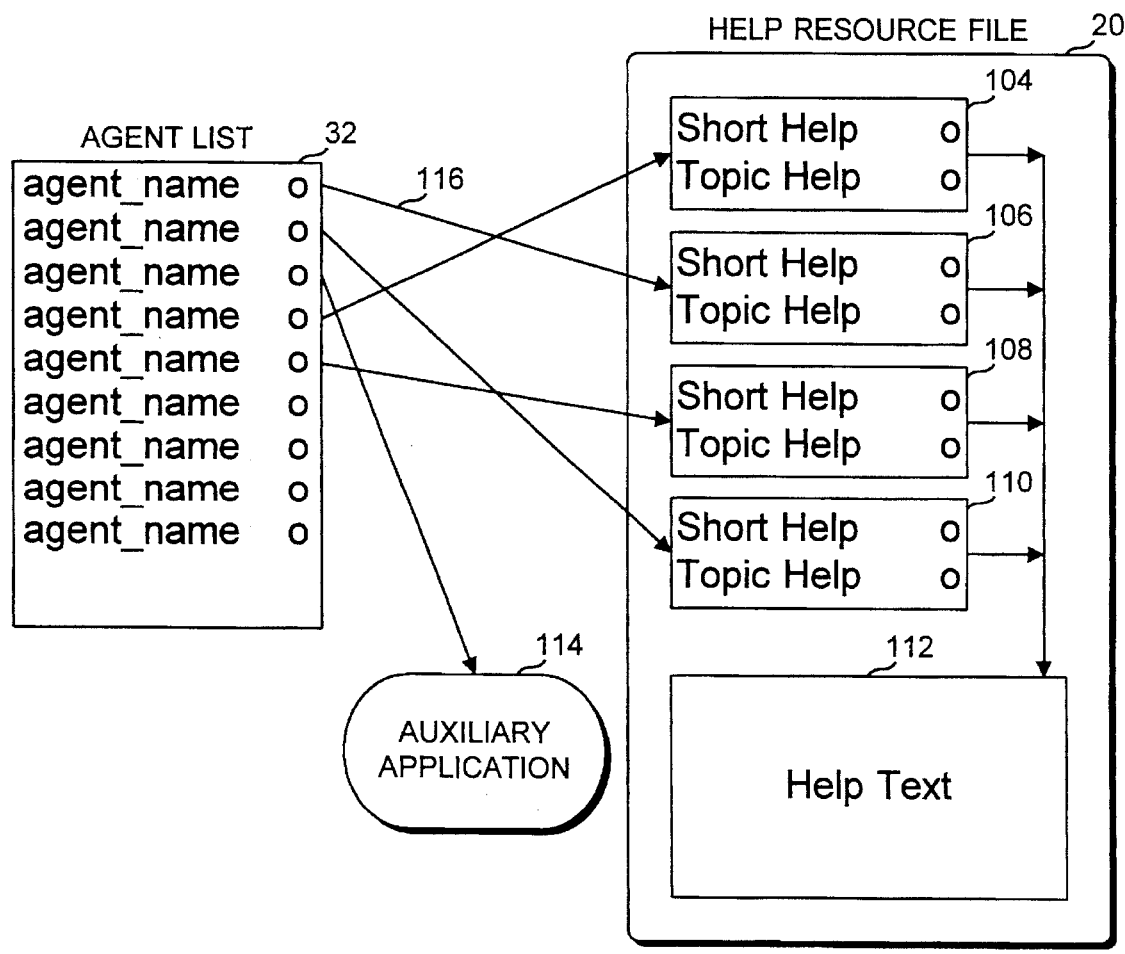
FIG. 5 is a diagram of the relationships between agents in the agent list, links and a Help Resource File.

FIG. 5 shows agent list 32 and help resource file 20 of FIG. 2. FIG. 5 also shows links, such as link 116, associated with an agent in agent list 32. Each link associates help text or some other help action with an agent in agent list 32. Each agent has an agent name represented by the symbol "agent_name" at 100. The links are symbolically shown to the right of agent list 32 at 102 originating at the small circles next to each agent name. Small circles without an adjacent arrow emanating from them are agent names without an associated link.

For example, the first agent name in agent list 32 has a link to help text 106. Help text such as help text 106 includes text for "Short Help" and "Topic Help." Short help is one or two lines of text that are displayed in an unobtrusive location on the display screen as the user operates an application program. Short help serves to give a brief description of the object that the user is focusing on at the moment. Topic Help is longer help text and allows the user to access a network of help text, known as "hypertext," to receive more detailed information about the features of the application program being used. Internally there are separate agents for each of topic and short help actions. The separate agents have the same link name but different triggering events.

Help text 106 points to additional help text 112 to implement various help features such as pop-up menus, hypertext, etc.

The second agent name in agent list 32 is linked to help text 110. The third agent name is linked to auxiliary application 114. The linking to an application program such as auxiliary application 114 represents the ability of the present invention to send messages to or execute functions in response to a user's request for help. The fourth agent name in agent list 32 is linked to help text 104 while the fifth agent name is linked to help text 108 and so on. The links, represented by the arrows emanating from agent list 32, are implemented by surveillance motor 30, MSW 16 and windows help engine 18 of FIG. 2.

Figure 6:
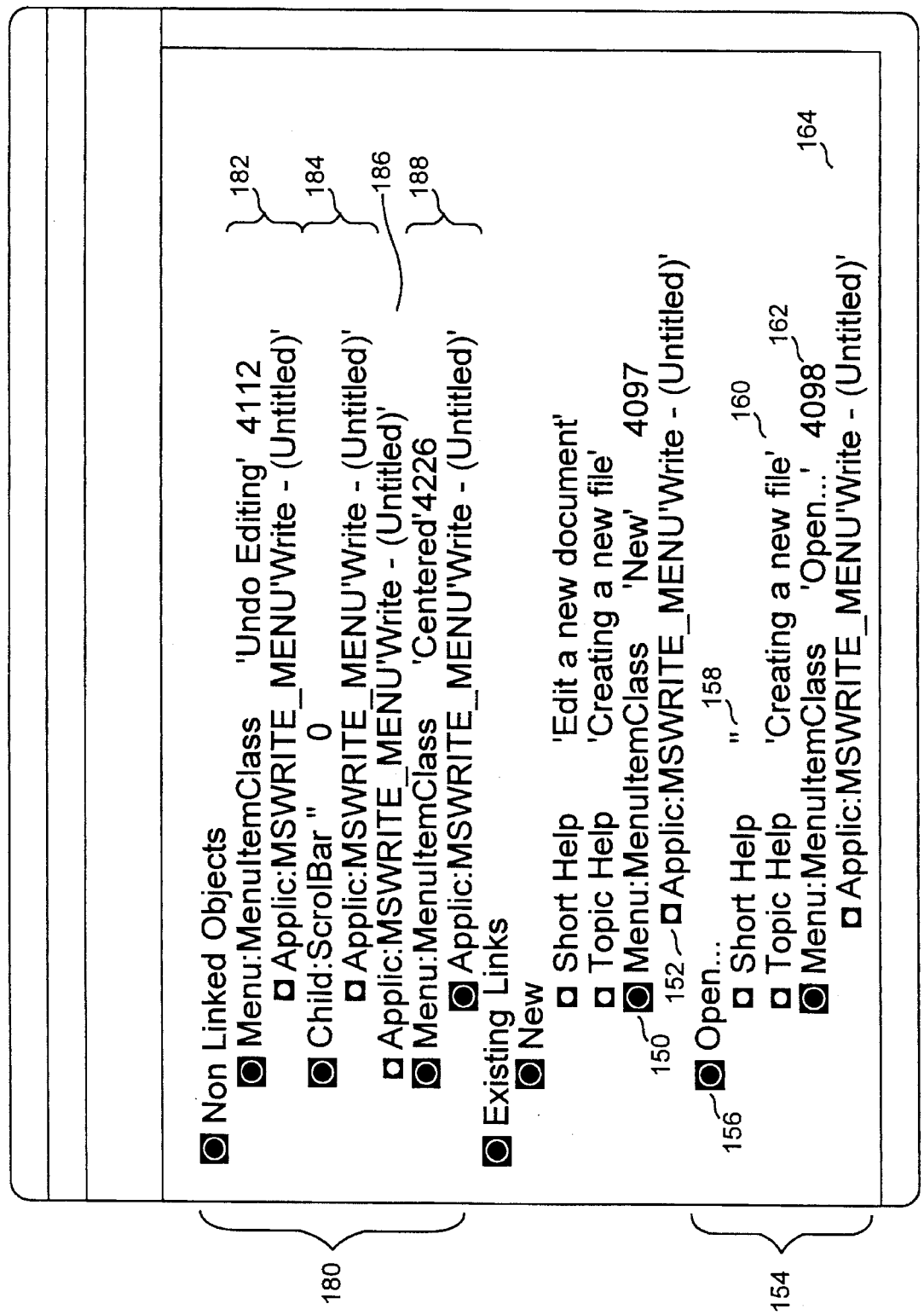
FIG. 6 shows an agent list.

FIG. 6 shows an actual agent list as it appears in a product called HelpMaker, manufactured by ddtec SA of France. The agent list shown in FIG. 6 is easily created using the point-and-click object capturing method of HelpMaker as described in "HelpMaker Reference Manual," version 1, published by ddtec SA (1992).

In the preferred embodiment, each "agent" includes an event, object and action. An event, such as a mouse click, on an object, such as a menu, produces an action, such as displaying help text on the display screen. An object is displayable on the display screen and has characteristics. Some examples of object characteristics are title, class, ID, style, ancestry of parent objects, number of child objects, rectangle, color, position on screen (x, y, z) and, in general, any characteristic of the displayable image visible to the user. The agent list is a list with an entry for each agent. The agents are matched to an object selected by the user by using one or more of the selected object's characteristics and matching them with characteristics in agent objects.

As shown in FIG. 6, the agent list in the preferred embodiment is organized into main headings, that of "Non Linked Objects" and "Existing Links." Under "Existing Links" are shown two links, that of "New" and "Open..." That is, the link "New" is the name of a link such as link 116 of FIG. 5. Under the link "New" there are shown entries for Short Help and Topic Help. The Short Help and Topic Help correspond to help texts such as help text 106 of FIG. 5. For the link "New" the Short Help is associated with the string "Edit a new document" while Topic Help is associated with the string "Creating a New File." The next item in the list under existing link "New" is the simple object Menu:MenuItemClass 'New' 4097. Immediately under this object is another simple object name Applic:MSWRITE_MENU 'Write—[Untitled]'.

These two simple objects define the object string (i.e., sequence of objects) of the more general "agent" which includes the two objects. That is, the agent made up of objects 150 and 152 has two objects. In general, the present invention describes an object by using all of its ancestor objects and a sufficient number of characteristics of those objects so that the object is unique among other objects in the agent list. In FIG. 6, the agent, including the object at 150 and the object at 152, includes the Title, Class and ID characteristics from object 150 and the Title and Class characteristics from object 152.

Similar to the link "New" a second link called "Open..." is shown at 154. The link name is shown at 156, the Short Help is shown as having a null string at 158, and Topic Help is shown associated with the string 'Topic Editor not loaded.' at 160. An agent including object 162 and object 164 includes all of the characteristics of objects 162 and 164, namely, "Menu:MenuItemClass 'Open...' 4098" and "Applic:MSWRITE_MENU 'Write—[Untitled]'".

Under Non Linked Objects at 180 in FIG. 6 are shown four agent names referred to as agent 182, agent 184, agent 186 and agent 188. An example of a non-linked object or agent is the sixth agent in agent list 32 of FIG. 5. Thus, agents may exist in the agent list without being linked to help text or a help action. Note that agents 182, 184 and 188 each include the characteristics of two objects while agent 186 only includes the characteristics of a single object. An agent's object string includes all ancestor objects and a varying number of characteristics of each object, depending on the detail necessary to establish the object uniquely, as discussed below.

Figure 7:
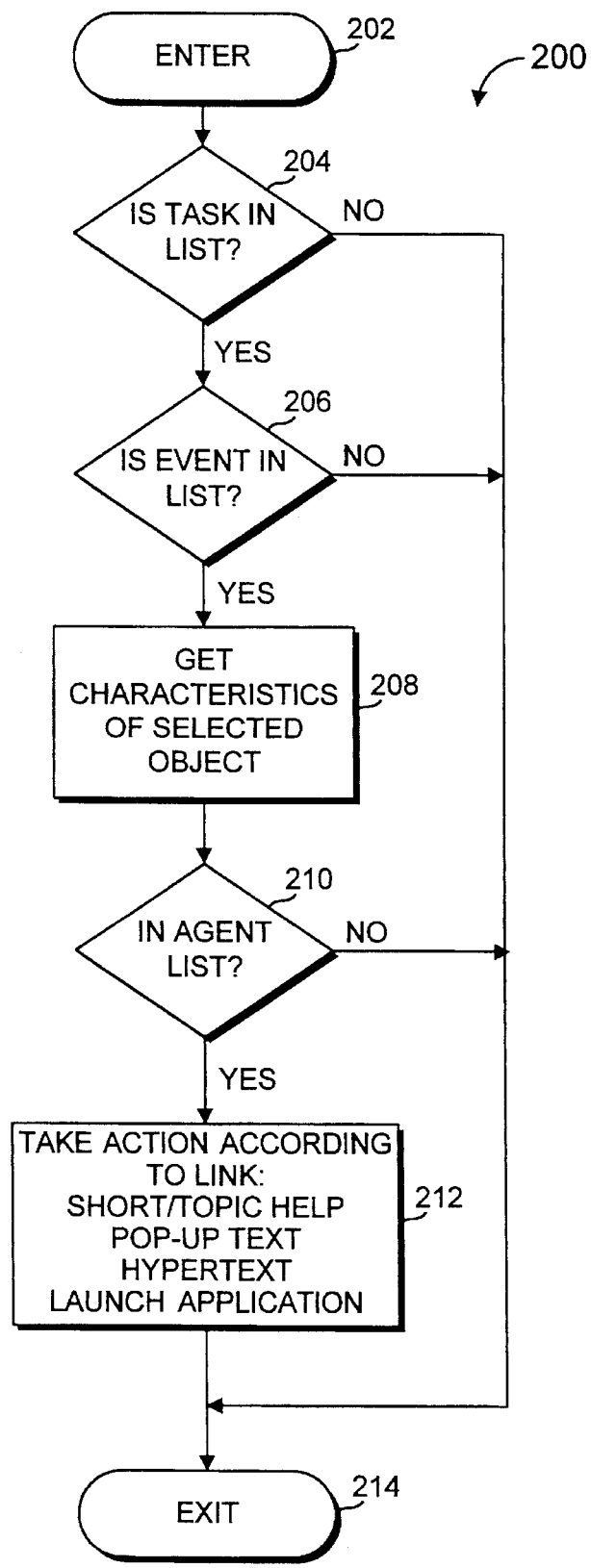
FIG. 7 is a flowchart for a routine in the present invention that matches objects in an agent list.

Next, FIG. 7 is discussed to describe a flowchart for a routine in the present invention that matches objects in an agent list.

In general, the flowcharts in this specification illustrate one or more software routines executing in a computer system such as computer system 37 of FIG. 3. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention. Additional considerations in implementing the method described by the flowchart in software may dictate changes in the selection and order of steps. Some considerations are event handling by interrupt driven, polled, or other schemes. A multiprocessing or multitasking environment could allow steps to be executed "concurrently." For ease of discussion the implementation of each flowchart is referred to as if it is implemented in a single "routine".

In FIG. 7, the routine of flowchart 200 is entered at step 202. Upon entry, it is assumed that the user has selected an object and requested context sensitive help for that object. In a preferred embodiment, the user selects an object by focusing on the object by moving the pointer over the object image on the screen and depressing a "hot key" combination such as CTRL-F1. When the user activates the hot key, the object image focused on is detected by the operating system which sends messages to applications.

The routine of flowchart 200 is implemented by a process called a "surveillance motor" in HelpMaker. The surveillance motor includes code such as the function MyKeyHook included in the source code Appendix of this specification. Other messages and events in the windows environment are intercepted by means of additional hook routines MyGetHook and MySndHook.

Upon entry of the routine of flowchart 200 the routine is provided with information about the selection that occurred such as the object focused on, the nature of the event, and the task from which the event was generated. At step 204, a check is made to detect whether the object has been selected from a task that the surveillance motor is supposed to be monitoring. This step is executed by the function check-Event in the source code appendix. The purpose of checking for tasks at step 204 of flowchart 200 is to quickly eliminate objects and events from further consideration if those objects and events are not from a task for which help is provided.

If the task is not in the list, execution terminates at step 214. However, if the task is in the list, execution proceeds to step 206 where a check is made as to whether the event that selected the object is included in an agent in an "agent list." Assuming the event is in the agent list, execution proceeds to step 208. In the preferred embodiment, an agent list is maintained by the surveillance motor for each specific event. An "agent" is a data entity that includes an event, object string and action. The agent list is merely a list of agents which the preferred embodiment users to match a user action (i.e., an event on an object) to a predefined linkname to invoke an action such as displaying help text. Before proceeding with the discussion of FIG. 7, definitions will next be given for basic data structures pertaining to the invention.

In a windows environment, a given selected object may have "ancestors" and "children" so that the object is part of a hierarchy where the given object is not accessible except when the given object's ancestor objects have been previously selected, or activated. Similarly, the given object's children are not accessible for selection until the after the selection of the given object.

When the system of the present invention needs to uniquely identify, or describe, a selected object it uses the handle of the selected object and obtains the selected object's characteristics by calling routines provided by the operating system or windows environment. If a sufficient number of characteristics are not obtainable the system uses techniques such as subclassing or subdividing, as discussed below, to identify the object. The system obtains enough object characteristics to uniquely identify the simple object and continues to describe each of the simple objects in the hierarchy of objects in a similar manner, by obtaining the objects' handles and using the handles to obtain characteristics. The described objects are linked together to produce an "object string" for the selected object. The selected object, itself, is included in the string. At a minimum the "string" may consist merely of the selected object and its characteristics.

Throughout this specification the term "object" is often used to indicate both the selected object and the string of objects which includes the selected object and the selected object's ancestor objects. When it is necessary to speak of a single object as part of an object string the term "simple object" is used. Object and simple object are synonymous in the case where the object has no ancestor objects.

Figure 8:
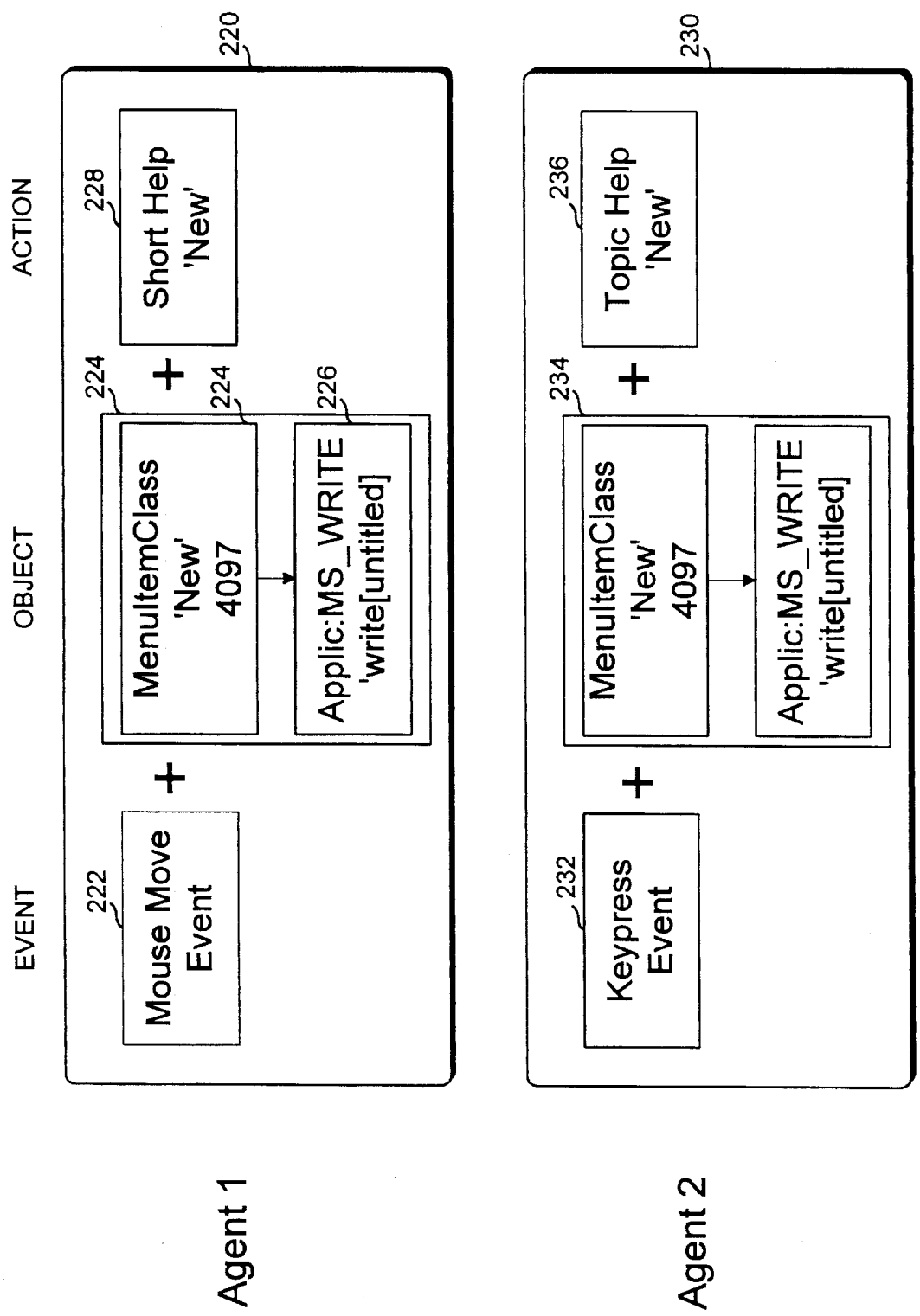
FIG. 8 illustrates data structures used in the present invention.

FIG. 8 illustrates the basic data structure of agents and objects. Agent 1 is shown including all items in box 220. Thus, Agent 1 includes event 222, "Mouse Move Event," an object string 223 which includes object 224 and its ancestor object 226, and action 228, "Short Help 'New'." Agent 2 is represented by box 230 and includes event 232, object string 234 (the same object string as object string 223) and action 236. Objects in object strings 223 and 234 have characteristics as shown by the characteristics within objects 224 and 226.

Object 224 has a Class characteristic of "MenuItemClass". Object 224 also has a Title characteristic of "New" and an ID characteristic of "4097". All or some of these characteristics may be used to help uniquely identify object 224. Additional characteristics may also be used. Object 226 has Class "Applic:MS_WRITE" and Title "Write—[untitled]". The arrow linking object 224 and object 226 shows that object 226 is the parent, or ancestor object, of object 224. This also means that object 224 is the child object of object 226. This relationship is reflected in characteristics such as "Number of Child Objects" and "Number of Parent Objects" for each object although these characteristics are not shown for objects 224 and 226 in FIG. 8.

Agents such as Agent 1 and Agent 2 reside in the agent list. Their object strings can be searched and matched to identify when the user is selecting an object that has been designated for a help action by a help text developer.

Returning to the flowchart of FIG. 7, at step 208 the characteristics of the object selected by the user are obtained. Next, step 210 is executed where characteristics of the selected object are compared with objects of agents in the agent list. A determination is made whether the object and event ("object+event") matches an object+event of an agent that is present in the agent list. As mentioned above, the surveillance motor keeps an agent list for each specific event so that searching of agents in lists is only performed on the agent list corresponding to a specific event. For ease of discussion the collective agent lists are referred to here as a single agent list. Agent lists may be shared between multiple applications and a single application may have multiple agent lists associated with it.

If the object+event is not in the agent list, execution terminates at step 214. If, instead, the object+event is in the agent list, execution proceeds to step 212 where a help action is performed according to the link for the matched agent. In a preferred embodiment, help text is provided as either Short or Topic Help. Further, pop-up text boxes can be provided, hypertext can be provided, or an auxiliary application can be executed, or "launched," in response to the user's request for help on a specific object image on the screen. Additional actions discussed below are the inhibition and control of an application program by the surveillance motor by substitution of "null" messages to inhibit action, and control of an application by generation of messages to invoke operations within the application program.

After the help action is performed at step 112, the routine of flowchart 200 exits at step 214.

Thus, FIG. 7 shows the basic high level logic steps used in the present invention to uniquely identify an event and object as being present in a predefined agent list.

Figure 9:
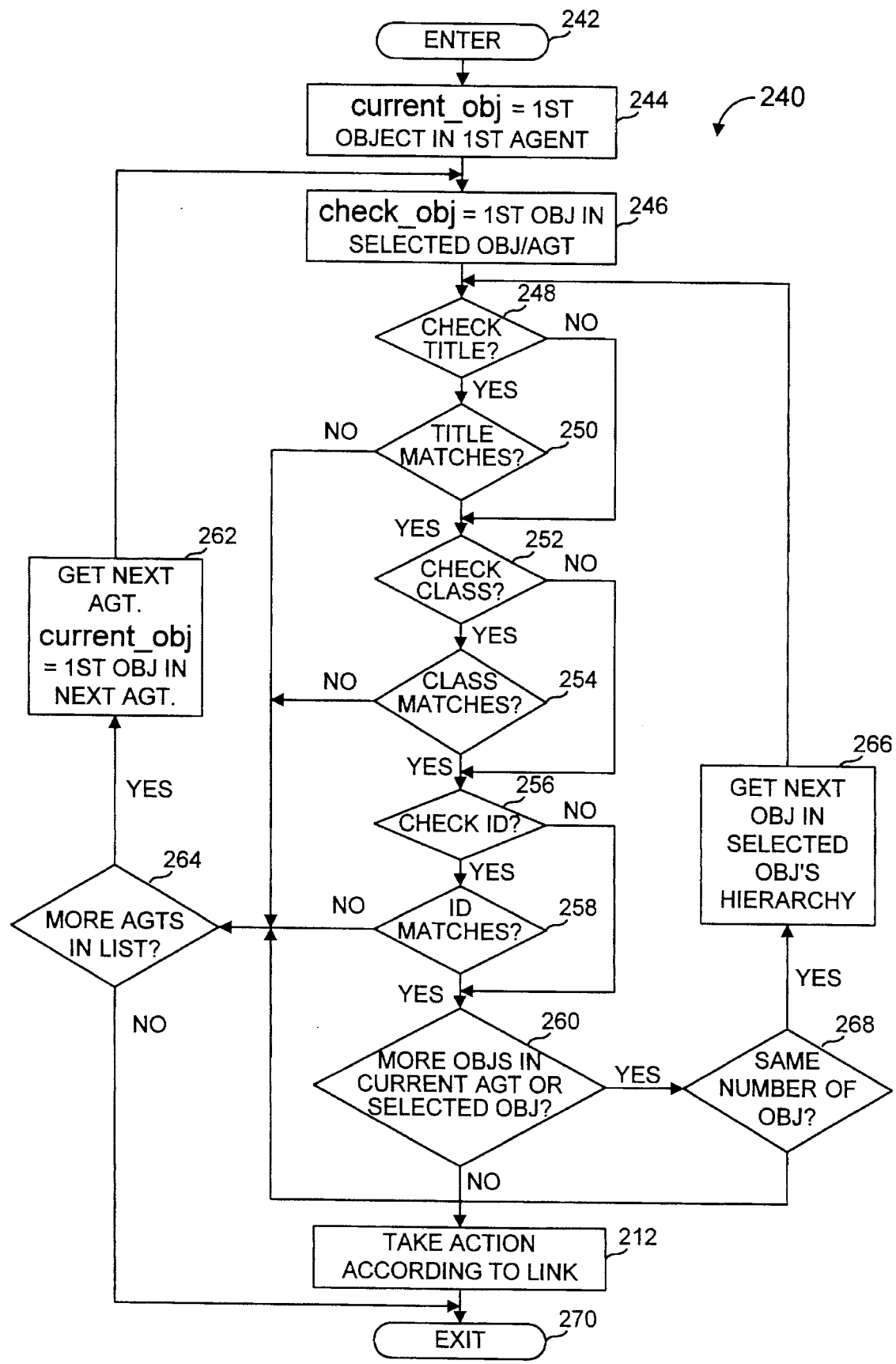
FIG. 9 is a flowchart illustrating more detailed steps in matching a selected agent to an agent in an agent list.

Next, FIG. 9 is discussed to illustrate more detailed steps in the matching of an event+object to an agent in an agent list.

FIG. 9 shows flowchart 240 that is an expansion of two steps shown in FIG. 7. Step 212 is common to both FIGS. 7 and 8 and the remaining steps in FIG. 9 all implement step 210 of FIG. 7. That is, steps 242–270 of FIG. 9 determine whether an event+object combination is in an agent list similar to the function of step 210 of FIG. 7.

In FIG. 9, the routine of flowchart 240 is entered at step 242 after step 208 of FIG. 7 has been executed. The object selected by the user has been determined and the characteristics of the selected object have been obtained. As mentioned above, an agent may include one or more objects. Each object may have multiple characteristics. In the preferred embodiment the characteristics of Title, Class and ID are primarily used. Other characteristics such as Style, Z Order, Signature, Child Count and Child Content may be used, as needed, to uniquely identify an agent object. In the present example, the selected object is described to produce an object string including its ancestor objects. Variable "check_obj" is used to specify the simple objects within the object string. The simple objects of the agent's object string are indicated by the variable "current_obj."

At step 244 current_obj is set to the first simple object in the first agent in the agent list. At step 246 check_obj is set to the first simple object in the selected object string. Steps 246–268 form a loop to check characteristics of object strings of each agent in the agent list against the characteristics of objects in the object string of the user's selected object. Comparison begins at step 248 where a test is made as to whether the title of the object is to be used in a comparison for purposes of matching the object string of the selected object to an object string in the agent list. If so, execution proceeds to step 250 where the titles of the current_obj and check_obj are compared. If the titles match, execution proceeds to step 252. Otherwise, execution proceeds to step 264 since the object's strings do not match.

Assuming the titles are to be checked and the titles do match, execution proceeds to step 252 where a test is made to see whether the class characteristics of the current_obj and check_obj objects are to be checked. In a preferred embodiment, the determination of which characteristics to check is dependent on a variable that is part of current_obj. Only those characteristics specified by current_obj are checked. Execution would also reach step 252 where the titles of the objects are not used as a comparison criterion. In the preferred embodiment, a variable "hmType" is used to indicate which characteristics are to be checked. In the preferred embodiment the user is able to specify which characteristics are to be checked and the characteristics checked may vary from agent to agent in the agent list.

Once step 252 is reached, execution will branch to step 256 if the class characteristic is not to be checked, or will proceed to step 254 if the class characteristics are to be checked. As before, if the characteristics are supposed to be checked and do not match then the current_obj is not a match and execution proceeds to step 264 where the next agent in the agent list is obtained and the loop to check check_obj characteristics against the new current_obj characteristics is performed. Step 264 determines if there are more agents in the agent list. If not, execution of the routine of flowchart 240 terminates at step 270 without ever providing any help action. If there are more agents in the agent list then step 262 is executed to assign the first object of the next agent's object string to current_obj and the loop beginning at step 246 is again executed.

Returning to the loop to check characteristics, Step 256 is executed where a test is made as to whether the ID characteristic is to be used as a criterion in matching an object/agent to the agent list. If so, execution proceeds to step 258 where the IDs are compared. If not, execution proceeds to step 260 where a check is made for more objects in the current agent's object string.

The current agent is the agent in the agent list that is currently being compared. If there are no more simple objects in the current agent and there are no more simple objects in the selected object string then a match has been found and an action is taken by executing step 212. Otherwise, execution proceeds to step 268. At step 268, if there are no more simple objects in the current agent or there are no more objects in the selected object string then the lengths of the object strings differ and, therefore, do not match so further matching of the current agent is abandoned and step 264 is executed to obtain the next agent in the list. If there are more objects to check in both the current agent and the selected object then execution proceeds to step 266.

In actuality, the preferred embodiment provides a default agent to "catch" all object/agent comparisons that do not match an other agents in the agent list. The default agent provides some action such as putting up a message that help does not exist for the selected object. The default agent may, instead, cause the system to search for another agent to handle the help request. This is achieved by calling check-Event as if the user had selected the parent of the selected object.

Ultimately, the routine of FIG. 9 exits with either having provided help action according to the agent list or having exhausted the agent list and performed some help action according to a default agent and link as described above.

Thus, flowchart 240 of FIG. 9 describes a method for selectively checking characteristics of objects in a selected object string against characteristics of object strings in a predefined agent list to determine a match of the selected object with an agent in the list. Once matched, the action corresponding to the matched agent in the list is performed. In the case of a help action, the link name is used to find the appropriate help text.

Signature Characteristic

As mentioned above, many object characteristics are standard characteristics such as Title, Class, ID, Style and Z Order. Other characteristics such as Child Count, Child Content and Signature are unique to a preferred embodiment of the invention.

A given object's Child Count is the number of child objects that belong to the given object. This number can be obtained for an object by accessing the internal windows manager list. Child Content is an object property that looks at the characteristics of the child objects of a given object in order to better identify the given object. In the invention as presented above a given object is identified in terms of the characteristics of its parent or ancestor objects. Thus, the Child Content characteristic presents another possible approach to identifying an object.

The Signature characteristic is a list of the functions and messages that result when a WM_Paint message is sent to the given object. After receiving the WM_Paint message the given object, i.e., the object that receives the message, repaints itself and, in doing so, calls other windows functions and sends out its own messages. The combination of function calls and message sends is the given object's "signature" in that the function calls and message sends will differ from object to object. Thus, the signature characteristic can be a useful characteristic to identify an object, especially if the object is difficult to uniquely identify by using other characteristics.

Subclassing

Some objects recognized as objects by the user are not considered as objects by the windows environment and, therefore, do not have a handle. This creates a problem for a system such as the present invention since object characteristics can not be obtained from the windows environment for these "non-objects" and, therefore, they can not be described as discussed above.

A solution is to "subclass" the non-objects which appear as objects to the user but are not treated as objects by the windows environment. Examples of these non-objects are menu items, list box items, text and bitmaps. For these non-objects key messages and functions are monitored in order to give an additional context which can further categorize a standard object. For example, each menu item selection is recorded so that when a capture occurs within a menu the specific menu item is captured rather than the menu window. This is in spite of the fact that the menu item is not a true object in that it has no class window handle, etc. A pseudo class is then given to the subclassed object (as well as other characteristics) and the window owning the menu is used as its parent.

Figure 11:
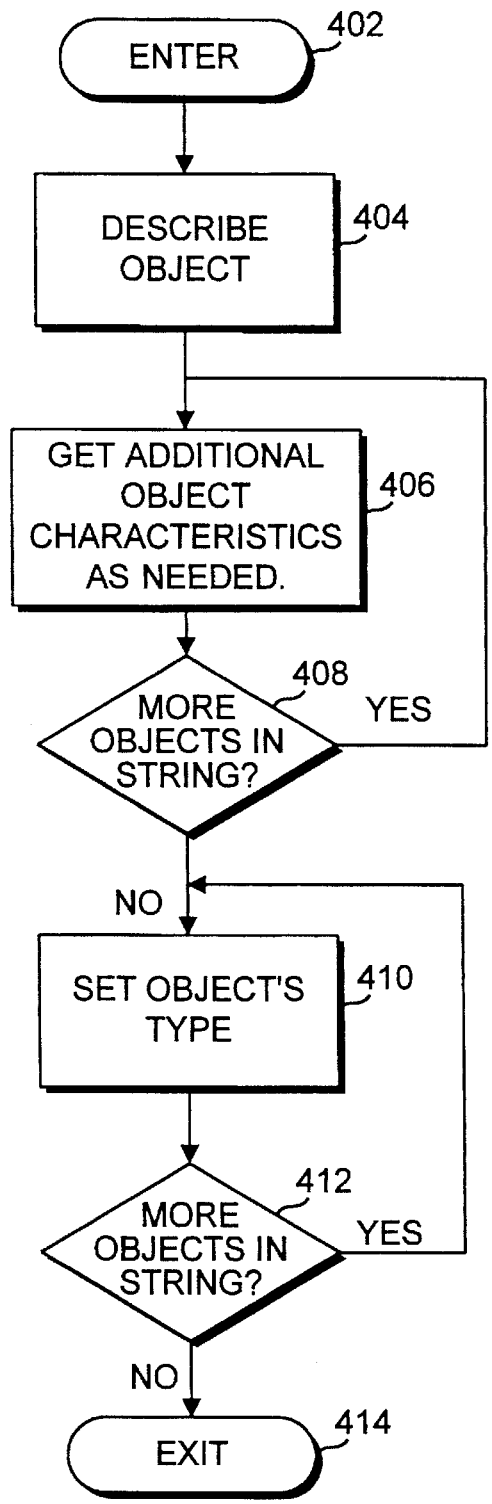
FIG. 11 is a flowchart for a routine that identifies an object.
Figure 12:
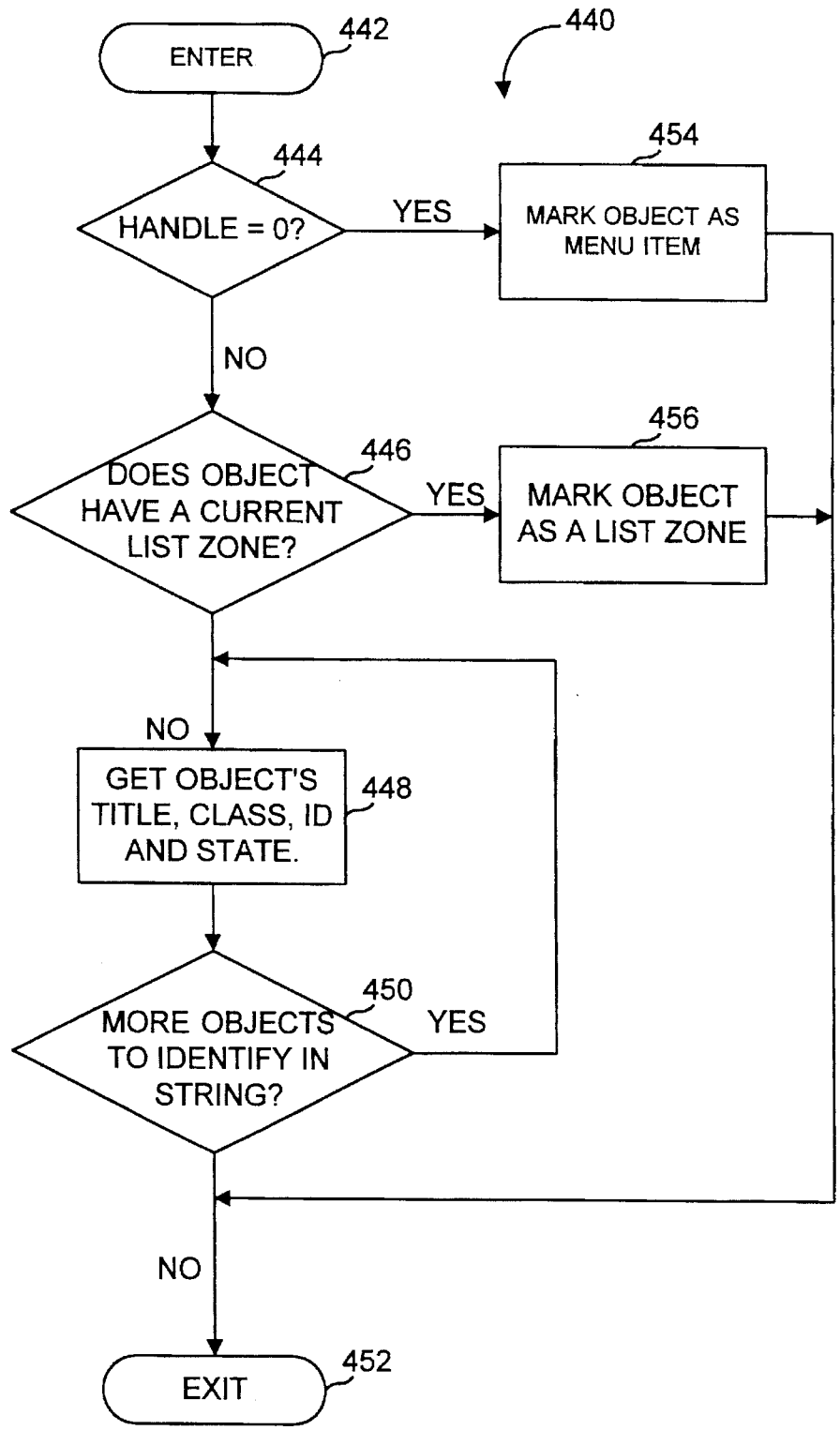
FIG. 12 a flowchart for a routine that describes an object.

In a broad sense, subclassing is the process of creating an object to correspond with an image (text or otherwise) on the screen when that image is not a naturally existing object within the windows environment. In order to show how the preferred embodiment handles subclassing, reference is made to the flowcharts of FIGS. 11 and 12. FIGS. 11 and 12 describe the basic steps in routines that are provided in the source code of Appendix A.

FIG. 11 shows flowchart 400 corresponding to routine identifyobject in Appendix A. Routine identifyobject calls routine DescribeObject of FIG. 12. Both routines (together with other routines and functions shown in Appendix A) implement the general aspects of the present invention of identifying objects by using object characteristics. However, these routines are discussed here to specifically illustrate how subclassing is carried out in the preferred embodiment. Reference should be made to Appendix A in conjunction with the discussion below.

Routine identifyobject is entered at step 402 where an object handle of a target object is passed to the routine. Routine identifyobject determines all of the characteristics of the target object that are needed to uniquely identify the object from among other objects in the host application program that generated the object. Part of the identification process includes identifying parent or ancestor objects. The parent objects are included in the object string for the target object.

At step 404, the target object is described by calling the routine DescribeObject. Routine DescribeObject performs actual subclassing of non-objects, or on-screen images that are not considered objects by the windows environment. It does this by interrogating the routines used to create the non-object such as application specific interface (API) functions, menu messages, etc., and determines if there is anything subclassed. Routine DescribeObject also sets the basic characteristics of the target object and all of the parent objects in the object's string.

Once the target object has been described step 406 in FIG. 11 is executed to get additional object characteristics, as needed. Referring to the source code for routine identifyobject in Appendix A, some additional characteristics may be the area of a window (if the object is a window), the state of an object and the type of an object (if the object is not a subclassed object).

Next, step 408 determines whether there are any other objects in the object string. If so, step 406 is again executed for the additional objects in the string until all of the objects in the string have been given additional characteristics, as needed.

Step 410 is then executed to describe the object's type by setting fields hmType and Typedesc, as needed. The field hmType is determined to establish the comparison criteria for the object as discussed in connection with FIG. 9. The value for the hmType field can be modified later by the user. The field Typedesc is determined to indicate, generally, the type of the object. Step 412 is similar to step 408 in that it ensures that step 410 is applied to all objects in the string. After all objects in the string have been processed, execution of routine identifyobject of flowchart 400 exits at step 414.

FIG. 12 shows a flowchart 440 for routine DescribeObject. Routine DescribeObject is called at step 404 of identifyobject in FIG. 11. Routine DescribeObject is entered at step 442 where the object handle is passed to it. At step 444 the routine checks for a handle value of 0 which indicates that the object is a menu item. If the object is a menu item it is marked as such at step 454 and execution of DescribeObject terminates at step 452. However, if the value of the handle is not 0 execution proceeds to step 446.

At step 446 a check is made as to whether the object has a list zone. List zones are used in the present invention to handle, for example, the case where an application program puts up a dialog box and one or more of the controls within the dialog box are text areas and not objects. While the application program is able to detect when the user selects a text area, such as the text "OK," the windows environment will not consider the text area as an object and will not alert the surveillance engine to events on the text area as with a valid windows object. In order to get around this problem the present invention includes "hooks" to the windows environment so that messages to/from the dialog box are intercepted by the surveillance engine. By keeping a record of the text and positions of text within objects such as dialog boxes the present invention is able to subclassify the text as an object.

List zones may be any image of interest that is displayed on the screen but that is not treated as an object by the windows environment. In order for a window to have a list zone the window first needs to be identified. The window's hmtype field contains information on whether or not the window contains list zones. If such is the case, the window is repainted after having put a trap on window functions such as EXTEXTOUT and BITBLT to monitor the repainting to detect sub-parts of the window. All of the trapped function calls are compared with the area where they take place on the screen. If the area coincides with the current cursor position the text (if any) and position is recorded. The text and position is later used by DescribeObject to define the list zone.

Objects with list zones have their list zones recorded by noting when calls to the windows environment are made that display text within an object. At the time of the call, the object and text are recorded. If the object has a list zone that has been recorded, execution of flowchart 440 of FIG. 12 proceeds to step 456 where the object is marked as a list zone and the routine exits at step 452.

Assuming the object does not have a list zone, basic characteristics of the object are obtained at step 448 where the object's title, class, ID and state are obtained. Step 450 repeats step 448 for all objects in the string of the target object. When there are no more objects to identify, execution of the routine exits at step 452.

Thus, the discussion above in connection with FIGS. 11 and 12 shows that the preferred embodiment implements subclassing of objects. This allows non-objects, i.e., items that appear as images on the screen but which the windows environment does not treat as valid objects, to be identified by subclassing the non-objects as objects and giving them properties such as a menu item type or list zone subclassification characteristic.

Multiple Help Systems for a Single Application

A problem arises with applying the system described above when multiple instances of a host application system are instantiated at one time. This can occur where multitasking is available, such as is typically provided by contemporary windows environments. For example, two instances of a word processing program such as Microsoft Write may be launched by a user.

The second instance of the word processor would presumably have a different file loaded. If the same help system is desired in both cases then there is no problem. However, in many cases it is desirable to provide a different help system for each instance of the application. For example, one help system would describe how to work with the type of document loaded in the first instance, making reference to specific elements in the document itself. When another document type is loaded a different help system is required. This may remain the case even if the two instances are not loaded simultaneously.

One way to remedy this is to have a program working in concert with the surveillance motor of the present invention load the word processing program. The word processing program specifies the document to load. As the word processing program is loaded the handle for any main windows created are detected and the corresponding tasks are added to the task list used in the check at step 204 of FIG. 7. Thus, a separate help system can be created and loaded along with each document type.

An alternative remedy is to distinguish the different instances of the application program (e.g., word processor) by their title bars assuming the application programs access named files. For example, two instances of Write would be titled "Write—Sales.WRI" and "Write—Costs.WRI" reflecting that the first instance is editing a document called "Sales.WRI" while the second instance is editing a document called "Costs.WRI".

In this way, the preferred embodiment distinguishes between two different objects, "Write—Sales WRI" and "Write—Costs.WRI" depending on which file is loaded. In fact, since all other objects in the application are descendants of the main window the effect is to double the number of objects which may be captured. This allows a separate help system to be created for each of the documents.

Note that the present invention can easily implement a single help system for two different applications. This is done simply by having a single agent list that includes agents having objects from more than one task. Enough characteristics of each object in each agent must be kept to identify objects as belonging to different tasks. However, if the same action is to be associated with similar events on similar objects between tasks then a same agent may be used in common between two or more tasks.

Modifying the Functionality of an Existing Application Program

A powerful feature of the present invention is the ability of a designer to modify the functionality of, or add extra functionality to, an existing "host" application program. The designer need not have access to the host application program's source code. The added functionality may be triggered by a user's selection and/or activation of one or more objects on the display screen or can be triggered by any of various events which are associated with objects. The windows environment notifies subscribing processes executing within the windows environment of events as they occur. By detecting the trigger events, inhibiting selected messages from reaching the host application, and sending controlling messages to objects within the host application program and the windows environment additional functionality or modified behavior is provided. In a preferred embodiment, messages are intercepted and inhibited from reaching the host application by substituting a null message, or message that has no effect on the operation of the host application program. For example, a mouse move to the current mouse pointer location is such a null message.

As with the help system, the unique identification of objects based on object characteristics is the key in adding or modifying functionality to an existing application program without having a need to modify and re-compile source code.

The present invention is able to control a host application program by using a "script file" which issues actions to be performed on objects within the host application program or within other application programs. In addition to specifying actions the script file uses "SYNC" commands to wait for an event to occur on a specified object.

Table II, below, shows an example of a script file containing six entries. The script file includes Keywords that may be an Action or a SYNC. The script file also contains a LinkName associated with each Keyword. The LinkName is a pointer to a simple object or an object string as discussed above, or is a pointer to an object or object string plus an event associated with the object or object string. Each entry in the script file consists of a Keyword and a LinkName. LinkNames that correspond to SYNC Keywords always include an event along with the pointer to the simple object or object string.

TABLE II

|   | KEYWORD | LINKNAME |
|---|---|---|
| 1 | DoubleClick | The Little Icon |
| 2 | Click | File Open |
| 3 | SYNC | The Dialog Box + Opening |
| 4 | Click | The OK Button |
| 5 | SYNC | The Dialog Box + Closing |
| 6 | Close | The Main Window |

In the script file of Table II, the first entry has a Keyword "DoubleClick" that is an action and a LinkName "The Little Icon" associated with the Keyword DoubleClick. The second entry has a Keyword that is the action "Click" and a LinkName "File Open." The third entry in the script file is a SYNC Keyword associated with a LinkName including "The Dialogue Box" plus the event "Opening."

The fourth entry in the script file of Table II includes the action "Click" on the object "The Ok Button". The fifth entry in the script file of Table II is a SYNC Keyword on the object "The Dialogue Box" with the event "Closing." Finally, the last entry in the script file of Table II is the action "Close" on the object "The Main Window."

Where the Keyword is an action such as "DoubleClick," "SYNC" "Click" or "Close" the script file is issuing an action to be performed on the object that is referenced by the pointer in the LinkName associated with the Keyword action. Thus, the first entry in the script file is a double click on an icon identified by the LinkName "The Little Icon." The LinkNames in this example are merely symbolic of pointers to data structures containing a description of an object according to the method of the present invention as discussed above in connection with the help system. That is, an object is identified as a simple object (or an object string that includes the ancestors of the object of interest) along with characteristics for the object (including other objects in the object string, if any) sufficient to identify the object of interest uniquely within the windows environment.

In order to uniquely identify the object pointed to by the LinkName "The Little Icon" the entire windows manager internal Z-order list of objects is checked. The Z-order list is actually a list of handles. A handle is obtained from the list and used to obtain the characteristics. This is done by using windows commands GetNextWindow, GetWindow and EnumChildWindows to go through each object in the Z-order list, obtain characteristics of the objects, and match the characteristics against the characteristics in the object string pointed at by "The Little Icon." The handle for the object is obtained from the Z-order list. Once the handle is obtained, it is used to send a message to the windows environment to perform the "DoubleClick" action on the object identified by the handle.

This procedure is followed for each of the Keywords that specify an action to be performed on an object. Different handling is required for Keywords which are SYNCs.

An example of a Keyword that is a SYNC is the third entry in the script file of Table II. The SYNC applies to the object pointed to by the pointer designated in this example as "The Dialogue Box." There is also the event "Opening" associated with the object. The LinkName "The Dialogue Box" points to an object string as with the above example for the first entry in the script file. An object in the windows internal Z-order list is matched with the object string by searching and comparing object characteristics as before. Once the object is identified in the Z-order list, the object's handle is obtained by using calls to windows environment functions. This allows the system to receive messages pertaining to "The Dialogue Box" object and to detect a specified event. In this example, the specified event is the opening of "The Dialogue Box."

In a preferred embodiment, a separate process such as the surveillance motor monitors messages indicating the status of objects that are being SYNCed to. When a message indicating the status of an object being SYNCed to is received, the surveillance motor sets a flag. For example, when "The Dialogue Box" is opened, a message is sent out by the windows environment that is intercepted by the surveillance motor of the present invention. The surveillance motor sets a flag which is detected by the process executing the script file of Table II. The process executing the script file of Table II is waiting for the SYNC command. For example, the third entry in the script file waits for the flag indicating that "The Dialogue Box" is being opened. Once the script file execution process detects the flag is set, the script file goes ahead and executes subsequent entries in the script file.

It can be seen that the script file of Table II thus controls objects in a host application program (launched by clicking on the "little icon" of entry 1) to do the following: (1) DoubleClick on the little icon to launch the application; (2) Click on an item in a menu to open a file; (3) SYNCs to the event of the dialog box opening; (4) clicks on the "OK" button in the dialog box; (5) waits for the dialog box to close and (6) closes the application's main window.

Thus, the script file of Table II launches an application program and opens a file. A more elaborate version of the script file could name the file and create and place data in the file. The file could then be stored and the application program exited. Note that the script file can be invoked by any predetermined event. That is, the script file can be executed when the user performs an event on an object such as clicking on an object on the screen. The occurrence of the event is determined by the methods discussed above. In this way, the present invention allows functionality to be added to an application program. A critical aspect of the invention is its ability to identify objects based on LinkNames in the script file by performing the same object characteristic matching discussed above in connection with FIGS. 7–9.

Figure 10:
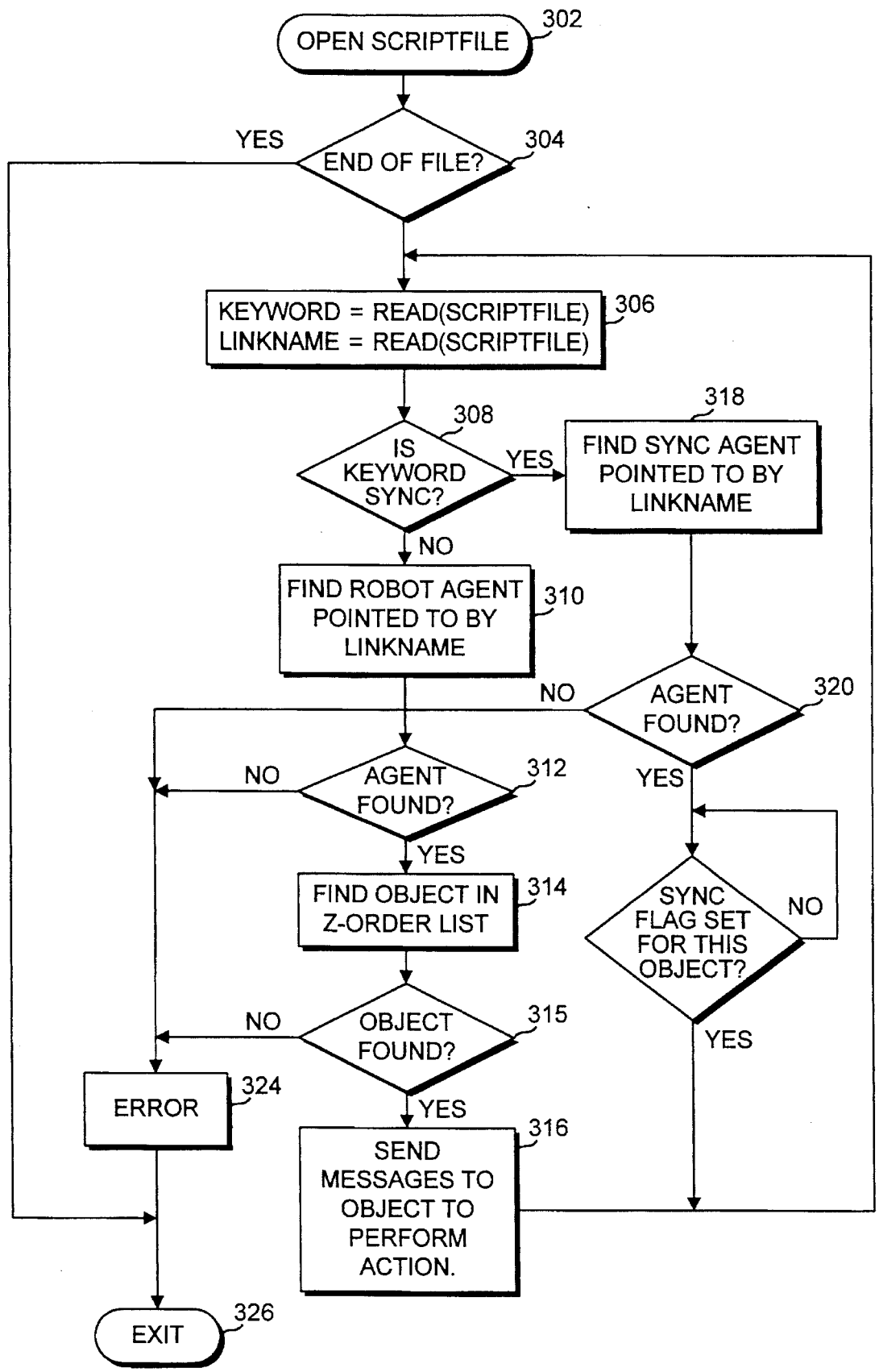
FIG. 10 is a flowchart for a routine to execute a script file.

To further illustrate a method for executing a script file the flowchart of FIG. 10 is next discussed.

FIG. 10 shows flowchart 300 for a routine to execute a script file, such as the script file of Table II. The routine is entered at step 302 where a script file is opened.

At step 304 a check is made as to whether there are any entries in the script file left to process. If so, execution proceeds to step 306 where the next Keyword and LinkName are read from the script file. At step 308 the Keyword is checked as to whether it is a SYNC or an Action. If the Keyword is a SYNC then step 318 is executed to find the agent (actually the agent's object or object string) that matches the object string in the agent pointed to by the LinkName. If no agent is found after the check at step 320 is performed then an error condition is flagged at step 324 and the routine is exited at step 326.

If a match is found then the routine stays at step 322 until the flag for the SYNC object (in the agent matching the LinkName) is set. As mentioned above, this flag may be set by a process external to the routine of flowchart 300, such as a process analogous to the surveillance motor discussed above in connection with the help system. The surveillance motor and the routine of flowchart 300 can be launched at the same time as the host application program and can become an extension of the binary executable of the host application and thereby extend the functionality of the application while appearing as an integral part of the application.

Once the setting of the flag for the SYNC object is detected at step 322 then execution returns back to step 306 where the next item in the script file is obtained.

At step 308 if the Keyword is not a SYNC, then it is assumed to be an Action and step 310 is executed. Step 310 looks for an agent's object string that matches the object string of the agent pointed to by LinkName. This is similar to step 318.

Assuming an agent is found, step 312 causes step 314 to be executed so that the object corresponding to the agent is compared to objects in the Z-order list. At step 315 a check is made as to whether the handle for the object in the agent has been obtained. If the handle is found then messages are sent to the windows environment to perform the action indicated by the Keyword and execution returns again to step 306 where subsequent entries in the script file are executed. If either the agent is not found at step 312 or the object's handle is not found at steps 314 and 315 then an error condition is flagged at step 324 and the routine exits at step 326.

When no more entries in the script file are left for processing as detected at step 304 the routine of flowchart 300 exits at step 326.

An example of a host application program that can be automated, or have functionality added to it, is a spreadsheet program. A typical spreadsheet has cells into which formulas may be entered. The added functionality could be in the form of a help system, or, more generally, a script file, that presents the user with a menu of formulas. The user is asked to select a formula and the selected formula is automatically entered into the desired cell in the spreadsheet program.

Many other examples of adding functionality to existing application programs will be readily apparent. The present invention provides the means to add such functionality and is not limited by any particular application.

There are two methods used in the preferred embodiment for attaching added functionality to an existing host application program. The surveillance motor can be loaded at boot time as an extension of the operating system or windows environment or the surveillance motor can be loaded later at the moment the host application program is first executed. In the first method, a check is made for the appearance of the application based on a timer signal. When the application becomes active it is automatically added to a list of tasks being monitored. This task list is the list checked at step 204 of FIG. 7. If the second method is used the surveillance motor is launched first and the surveillance motor then launches the application automatically. The surveillance motor then detects the appearance of one or more new mainWindows for the host application and adds them to the list of tasks being monitored.

The preferred embodiment allows a user to create an "embedded" executable version of an application program with added functionality along the lines of the second method. The added functionality is provided by the present invention as discussed above. The embedded version of the application program is launched, or invoked, in an identical manner as the original application program executable so that the additional programs and data necessary to provide the added functionality are "transparent" to the user. That is, the user is not able to detect that the program has been renamed.

As an example, assume an original application program (without added functionality) exists called "write.exe". A surveillance file is created and named "write.srv." The surveillance file is a binary file that contains information such as a script file as discussed above to provide added functionality to the application program. As before, the surveillance program (i.e., "motor") must be launched to monitor user selections and perform actions when the user selects an object that has a predesignated action associated with it. In the preferred embodiment the surveillance motor is named "hmrun.exe".

The hmrun.exe program is renamed so that the name of hmrun.exe is now the name of the application program, "write.exe," in our example. This means that when the user launches write.exe, hmrun.exe is actually being launched instead. The application program write.exe is renamed, also. In this example write.exe is given the name write2.exe. The new name for the application program is placed in the write.srv file. The renamed hmrun.exe accesses the write.srv file which has been modified to obtain and launch the application program by its new name and to obtain and execute the entries in the script file to provide added functionality.

To further illustrate this example, Table III below shows pseudo code that describes the steps that the program hmrun.exe performs to achieve transparent embedding.

TABLE III

```
1   curName := getLaunchedName;
2   if curName <> "hmrun" then begin
3       srvFile := curName + 'srv';
4       passedParm := Param(1) + Param(2) + . . . ;
5       cmd_str := curName + '2.exe' + passedParm;
6   else
7       srvFile := Param(1);
8       cmd_str := ReadFile(srvFile);
9   end
10  Execute(cmd_str);
```

Line 1 of the pseudo code of Table III obtains the name used to launch the surveillance motor. This is easily obtainable, for example, in a windows environment such as Microsoft Windows by accessing the value of system parameter 0 as Param(0) which returns the first item typed into a command line to execute a program. If the program is launched by clicking on an icon then the windows environment sets Param(0) as if the program had been launched by name.

Once the name used to launch the program is obtained, Line 2 of the pseudo code checks to see whether the name is the original name ("hmrun") given to the surveillance motor. If the name has been changed then it is assumed that the surveillance motor is embedded. Lines 3, 4 and 5 are executed if it is determined that the surveillance motor is embedded. Line 3 forms the name of the surveillance file (the ".srv" file) by assuming that the renamed surveillance motor and the surveillance file have the same root names. Line 4 obtains any parameters that may have been passed to the surveillance motor when it was launched. These parameters need to be passed to the real application program for which they were intended. Line 5 forms a command line of the complete name of the application program and attached parameters. Line 10 is of the pseudo code of Table III is next executed to launch the application program and pass the parameters to the program.

If, on the other hand, the name used to invoke the surveillance motor is determined to be the original name for the surveillance motor, hmrun, at line 2 then it is assumed that the surveillance motor is not running embedded and the script file is obtained from the second parameter on the command line by the pseudo code statement "srvFile :=Param(1);" at Line 7. Line 8 obtains a command line from the .srv file that specifies the name of the application program to execute. In this case the .srv file includes the name write.exe and any parameters that need to be passed to write.exe. Line 10 is then executed to launch the application program.

Thus, the pseudo-code of Table III shows how an embedded surveillance motor can be invoked transparently to the user simply by having the user attempt to invoke an application program (e.g., "write.exe") by the application program's original name in the standard way assuming that the surveillance motor has been renamed to the application program's original name and the application program, itself, has been renamed to a known new name.

This method of transparent embedding works similarly when icons are used to launch programs as long as the icons are copied analogously to the renaming described above. That is, in the present example, the icon for write.exe is copied into the hmrun.exe program before renaming. In this way the hmrun.exe program is launched with the same icon that the user is used to using to launch the application program. For information on copying icons and more details relevant to embedding processes see, e.g., "MSJ 1991 #5," September–October Issue, article entitled "What's in There? Windows 3.0 Executable and Resource File Formats Revealed," by Miller Freeman, Inc., San Mateo, Calif.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

APPENDIX A

```
{ Help maker recognised object types        }
const
 HM_CHILD = 1;
 HM_MENUITEM = 2;
 HM_POPUP = 3;
 HM_DLGCTRL = 4;
 HM_HM-DLGSTATIC = 5;
 HM_DLGBOX = 6;
 HM_MAPPWIN = 7;
 HM_TEXTZONE = 8;
 HM_OTHER = 8FFFF;

{ window states    }
 HW_ICONIC = 1;
HW_MAXIMIZED = 2;
HW_NORMAL = 3;

{ uniqueness qualifiers    }
HU_ID = 1;
HU_CLASS = 2;
HU_CAPTION = 4;
HU_CAPCLSS = HU_CLASS + HU_CAPTION;
(*HU_STYLE = 8; *)
HU_STATE = 16;
HU_DontBlink = S400;
HU_OEMText = S800;
HU_DontPres = S1000;
HU-DivideWords = S2000;
HU-SubZones = S4000;
HU_NONE = SFFFF;
HU_SAFETYNET = SFFFE;

(* non compressed object structure  *)
TPobjDesc = ^TObjDesc;
TObjDesc = record
    caption: array[0..80] of char;
    class: array[0..80] of char;
    ID: integer;
    style : Longint;
    HMtype : word;                      (* specifies uniqueness  *)
    Typedesc : word;                    (* type descriptor for interface *)
    state : integer;
    parent,child : TPObjDesc;
    area : integer;
    objHan : hwnd;
end;

TPObjDescBuf = ^TObjDescBuf;
TObjDescBuf = Array [1..MaxObjdesc] of TObjdesc;

TStrOff = word;
TMemOff = word;
hEvent = word;
hObject = word;
hAgent = word;
TObjHandle = Word;

TPobjAdr = ^TobjAdr;
TobjAdr = ^TNewObj;
(* compressed object structure  *)
TNewObj = record
(*   sz : word; (* size of this struct including this word and variable par
```

```pascal
    Caption,Class : TstrOff; (* offset in string segment where      pascalZ
string
    ID : integer;     (* handle of task, child ID or item # if menu etc. *)
    HMtype : word;
        Typedesc : word;    (* type descriptor for interface)
    state : integer;
    sibling, parent, child, TObjHandle;
    nextObj : TMemOff;
    useCnt : word;
end;
TpNewObj = TObjAdr; (* synonyms *)

(* It's a menu object *)
Function GetMenudata (Oban : Hwnd)  : TPMenuObj; far;
var
    cnt,i : integer;
begin
    (* if the item contains a popup, curmenuitem is the handle of the popup
    (* this means it will change from instance to instance
    (* the text will be copied, and uniqueness will be set to id_caption
    if ( CurMenuType and MF_Popup ) <> 0 then begin
        MenuObj, item : = 0;
        cnt ; = GetMenuItemCount (curmenuhan)-1;
        if cnt = -1 then
            lstrcpy (@menuobj.text, 'not a valid menu handle')
        else begin
            i : 0;
            repeat
                cursub : = getsubmenu(curmenuhan,i);
                i := i + 1;
            until (cursub = curmenuitem) or (1 > cnt);
            if cursub = curmenuitem then begin
                GetMenuString(curmenuhan,1-1, @MenuObj.text, 80, mf_byposition)
            end
    end
end
else begin
        GetMenuString(curmenuhah, curMenuItem, @MenuObj.text, 80, mf_bycommand)
        MenuObj.item : = curMenuItem;
    end;
    getmenudata := @Menuobj;
end;
(* just returns a pointer *)
procedure myNew(var myPtr : TPObjDesc);
begin
    Inc( nObjDesc);
    if nObjDesc > maxObjDesc then begin
        (* overwrite the parent untl the eventual parent is put in *)
        dec(nObjdesc);
(*          MessageBox(0,'Too many Obj Desc' 'Error', MB_OK );   *)
    end;
    myPtr := addr(objDescList[nObjDesc]);
end;

(* will describe an object without concerning itself with the type *)
(* used for fast identifications *)
(* describes an object with its parentage *)
(* returns a pointer to the first in a series of structures describing *)
```

```
(* the object. This first description contains a pointer to the parent etc. *)
(* disposes of the last allocated chain first, if any *)
Function DescribeObject(Objhan : Hwnd; Clientid : word) : TPobjDesc;

var tempwin : Hwnd;
    parentptr, childptr : TPobjdesc;
    MenuPtr : TPMenuobj;
    tst : string[4];
    parwindow : Hwnd;
    Gt            : TGettext;

begin
    nObjDesc := 0;
    parwindow := Objhan;
    myNew(objectpointer);
    objectpointer^.child := nil;
    ObjectPointer^.parent := nil;
    Objectpointer^.objhan := objhan;
    if (objhan - $0)    (* This means it's a menu    *)
        then begin
            (* for popup menus, if there is no parent (like in floating menus)
            (* we invent one, set to the focus window
            parwindow := Curpopmainwin;
            MenuPtr := getmenudata(objhan);
            LstrCpy(ObjectPointer caption,MenuPtr^.text);
            ObjectPointer^.id := MenuPtr.item;
            if ObjectPointer^.id = 0 then
                ObjectPointer^.HMtype := HU_CAPTION
            else
                ObjectPointer^.HMtype := HU_ID;
            LstrCpy(ObjectPointer^.class, 'MenuItemClass');
            Objectpointer^.style := $FFFFFFFF;
            ObjectPointer^.typedesc := HM_MENUITEM;
            MyNew(ObjectPointer^.parent);
    end else begin (* either a normal window or a zoned text window *)
        if lastzonedwindow <> 0 (* it's a zoned window !!! *)
            then begin
(*              mymessagebox(0,GetZonedWindowsText(lastzonedwindow), 'error', 0
                LstrCpy(ObjectPointer ^.caption,GetZonedWindowsText(objhan));
                if Lstrcmp(objectpointer^.caption,'') <> 0 then begin
                    parwindow := lastzonedwindow;
                    LstrCpy(ObjectPointer^.class, 'TextZoneClass');
                    Objectpointer^.style := $FFFFFFFF;
                    ObjectPointer^.typedesc := HM_TEXTZONE;
                    ObjectPointer^.HMtype := HU_CAPTION;
                    ObjectPointer^.id := 0;
                    MyNew(ObjectPointer^.parent);
                end;
        end;
    end;
    (* start filling the chain, starting at the object and ending *)
    (* at the desktop                                                            *)
    tempwin := parwindow;
    if objectpointer^.parent = nil then begin
        tmpptr := objectpointer;
        childptr := nil;
    end else begin
        tmpptr := objectpointer^.parent;
        childptr := objectpointer;
    end;
    repeat
        (* copy the information found    *)
```

```
        tmpptr^.objhan := tempwin;
    (* Bug Fix for BiblioSystem *)
        GT.win := tempwin;
        Gt.MaxLen := 80;
        GT.Buff := tmpptr^.caption;
        SendMessage(utilwin, hm_Gettext,0,Longint(@GT) );
        GetClassName(tempwin,tmpptr^.class,80);

tmpptr^.style Getwindowlong(Objhan,GWI,STYLE);
        tmpptr^.id := getwindowword(tempwin,gww_id);
        tmpptr^.child := childptr;   (* the old one     *)
        tmpptr^.HMType := HU_CAPCLSS; (* default until identified *)
        tmpptr^.Typedesc := HM_Other; (* default until identif *)
        tempwin := getparent(tempwin);
        if tempwin = 0 then
            tmpptr^.parent := nil
        else
            myNew(tmpptr^.parent);
        childptr := tmpptr;
        tmpptr := tmpptr^.parent;
    until tempwin = 0;
    describeobject := objectpointer; (* return the first in the struc *)
end;

function getstate(objhan : Hwnd) : integer;
begin
 if isiconic(objhan)
    then getstate := HW_ICONIC
    else if iszoomed(objhan)
            then getstate := HW_MAXIMIZED
            else getstate := HW_NORMAL;
end;

function matchClass(class:PChar;Clientid : word):TPNewObj;
var
    pObj : TPNewObj;
    pClient : TPClient;
    workID : word;
    ObjSeg : wWord;

begin
    matchClass := nil;
{     if mainWin = 0 then exit;   *)
    workID := SendMessage(mainWin, hm_GetClientID, 1(*workID*), 0);
    pClient := GetClientPointer(workID); }
        pClient := GetClientPointer(Clientid);
        ObjSeg := Tdword(pClient^.firstObject).hi;

pObj := pClient^.firstObject;
    while pObj^.parent <> 0 do pObj := GetObjAdr(pObj^.parent,ObjSeg); (*get pObj
:= GetObjAdr(pObj^.child,ObjSeg); (* first top level*)

while TDWord(pObj).lo <> 0 do begin
        if CompareString( pObj^.class, class, pClient^.stringSeg ) tp
            matchClass := pObj;
            exit;
        end
        pObj := GetObjAdr(pObj^.sibling,ObjSeg);

end; (*while*)
end;
```

```
function matchWindows(curObj:hwnd):hwnd;
var
    className,classBuff : array[0..81] of char;
    tempWin : hwnd;

begin matchWindows := 0;
 GetClassName(curObj, className,80);
 if not iswindow(curobj) then exit;
 tempWin := getNextWindow(curObj,Gw_Hwndfirst);;
repeat
    if tempWin <> curObj then begin
        GetClass Name(tempWin, classBuff,80);
        if (lstrCmp(className, classBuff) = 0) then begin
                matchWindows := tempWin;
                exit;
        end;
    end;
    tempwin := getNextWindow(tempwin,Gw_Hwndnext);
 until (tempWin = 0);
end;

function uniqueClass(curObj:hwnd;Clientid : word):TPNewObj;
var
    className,title : array[0..81] of char;
    pObj : TPNewObj;
    tempWin : hwnd;
    workID : word;
    pCliente : TPClient;
begin
 uniqueClass := nil;

{ if mainWin = 0 then exit;
 workID := SendMessage(main Win, hm_GetClientID, l(*workID*), 0);
 pClient := GetClientPointer(workID); }
 pClient := GetClientPointer(Clientid);

tempWin := matchWindows(curObj);
GetClassName(curObj, className,80);
GetWindowText(curObj, title, 80);

pObj := matchClass(className,Clientid);
if (pObj <> nil) and
    not CompareString(pObj^.caption,title,pClient^.stringSeg)
    then begin
        uniqueClass := pObj;
        if (tempWin = 0) and (pObj^.hmType = HU_CAPCLSS ) then begin
            (* diaglog box won't go up *)
            TDWord(pObj).hi := 0;
            TDWord(pObj).lo := 1;
            uniqueClass := pObj;
            exit;
        end;
end;

if tempWin <> 0 then begin (* found a match *)
        if (pObj <> nil) and
           (pObj^.hmType = HU_CLASS) and
           (pObj^.typeDesc = HM_MAPPWIN) then begin
            pObj^.hmType := HU_CAPCLSS;
        end; (* if *)
```

```
            (* diaglog box won't go up *)
            TDWord(pObj).hi := 0;
            TDWord(pObj).lo := tempWin;
            uniqueClass := pObj;
        end;

end;

function getHmType(Oorg :TpobjDesc;Clientid : word) : word;
var
    Ocomp : TObjDesc;
    Tempwin,Awin : Hwnd;
    Task : word;
    Temptask,workID : word;

unique : bool;
    pObj : TPNewObj;
    pClient : TPClient;

begin
    GetHmType := HU_NONE;  (* Default case *)

if Oorg^.Typedesc = HM_DLGBOX then begin
        GetHMtype := HU_CAPCLSS;
        exit;
end;
if not iswindow(Oorg^.objhan) then begin
(*   messagebox(0,'not a valid window', 'gethmtype',mb_systemmodal);  *)
        exit;  (* error *)
end;
Awin := getnextwindow(Oorg^.objhan,GW_Hwndfirst);
Task := getwindowtask(Oorg^.objHan);

if Oorg^.Typedesc = HM_MAPPWIN then begin
    pObj := matchClass(Oorg^.class,Clientid);
{       if mainWin = 0 then exit;
    workID := SendMessage(mainWin, hm_GetClientID, 1(*workID*), 0);
    pClient := GetClientPointer(workID);     }
    pClient := GetClientPointer(clientid);
    if (pObj = nil) or
        CompareString(pObj^.caption,Oorg^.caption,pClient^.StringSeg)
        then begin
            (* if they've got the same title and class as an object al *)
            (* ready in memory, copy the properties of that object *)
            if pobj <> nil then begin
                Lstrcpy(Oorg^.caption,getstring(pobj^.caption, pClient^.stringseg
                gethmtype := HU_CAPCLSS;
                exit;
            end;
        tempWin := matchWindows(Oorg^.objHan);
        if tempWin = 0 then begin
            getHmType := HU_CLASS;
        end
        else begin
            getHmType := HU_CAPCLSS;
(*          Lstrcpy(Oorg^.caption,getstring(pobj^.caption, pClient^.str
        end;
    end
    else begin
        getHmType := pObj^.hmType;
    end;
```

```
        exit;
    end; (* if HM_MAPPWIN *)

if not (Oorg^.Typedesc in [HM_CHILD,HM_DLGCTRL]) then exit;
    Temptask := getwindowtask(Awin);
    unique := true;
    Tempwin := Awin;
    repeat
        if (Temptask = task) and (tempwin <> OOrg^.objhan) then begin
            ocomp.id := getwindowword(tempwin,gww_id);
            if Ocomp.id = Oorg^.id
                then unique := false;
        end;
        Tempwin := getnextwindow(tempwin,GW_Hwndnext);
        Temptask := getwindowtask(Tempwin);
    until (tempwin = Awin) or (tempwin = 0);
    if unique = true then begin
        getHMtype := HU_ID;
        exit;
    end;

(* third step : check for uniqueness of the title *)

unique := true;
    Temptask := getwindowtask(Awin);
    Tempwin := Awin;
    repeat
        if (Temptask = task) and (tempwin <> Oorg^.objhan) then begin
            GetWindowText(tempwin,ocomp.Caption,80);
            if (LstrCmp(ocomp.caption,Oorg^.caption) = 0)
                then unique := false;
        end;
        Tempwin := getnextwindow(tempwin,GW_Hwndnext);
        Temptask := getwindowtask(Tempwin);
    until (tempwin = Awin) or (tempwin = 0);
    if unique then getHMType := HU_CAPTION;

end;

function getTypedesc(objhan : Hwnd; Podesc :TpobjDesc) : word;
var 1 : integer;
    l2 : longint;
    LPOdesc : TPobjDesc;
begin
    POdesc^.Typedesc := HM_OTHER;
    getTypeDesc := PoDesc^.Typedesc;
    l2 := Getwindowlong(Objhan.GWL_STYLE);
    if (L2 and WS_CHILD <> 0 then begin
        Podesc^.typedesc := HM_CHILD
        getTypeDesc := PoDesc^.Typedesc;
        exit;
    end;
    if ((L2 and WS_POPUP)<> 0) then
        Podesc^.typedesc := HM_POPUP;
    if (Lstrcmp(Podesc^.class,'#32770') = 0) then begin
        Podesc^.typedesc := HM_DLGBOX;
        LPoddesc := Podesc^.child;
        while LPOdesc <> nil do begin
            if LPOdesc^.Typedesc <> HM_MenuItem then
                LPOdesc^.Typedesc := HM_DLGCTRL;
            LPOdesc := LPOdesc^.child;
        end; (* while *)
```

```
            getTypeDesc := PoDesc^.Typedesc;
            exit;
        end;
    if getparent(Objhan) = 0 then
            Podesc^.typedesc := HM_MAPPWIN;
    getTypeDesc := PoDesc^.Typedesc;

end;

(* will take the described object chain and identify it                    *)
Function identifyobject(objhan : Hwnd;Clientid : word) : TPobjdesc;
(*var MenuPtr : TPMenuobj;*)
var Pereadesc : Pchar;
begin
(* get the fast object description of the object and its parents *)
(* this will fill in all the 'basic' fields, and the TYPEDESC and HMTYPE *)
(* only if it's az menu item in a submenu                                 *)
objDesc := DescribeObject(ObjHan,Clientid);
LobjDesc := Objdesc;
while Lobjdesc <> nil do begin (* determine the area of the window  *)
            objhan := LongDesc^.objhan;
            Lobjdesc^.Area := DefWindowproc(objhan,WM_Nohittest,0,longint(Helpp
            Lobjdesc^.state := getstate(Objhan);
            if(LobjDesc^typedesc <> HM_MENUITEM) and    (*filled in by desc)
              (LobjDesc^.typedesc <> HM_TEXTZONE)
                    then LobjDesc^.typedesc := getTypedesc(objhan,LobjDesc);
            Lobjdesc := Lobjdesc^.parent;
    end;(*while*)

LobjDesc := Objdesc;
    while Lobjdesc <> nil do begin
        if (LobjDesc^.typedesc <> HM_MENUITEM) and
           (LobjDesc^.typedesc <> HM_TEXTZONE
         then LobjDesc^.HMtype := geLHMtype(Lobjdesc,Clilentid);
        Lobjdesc := Lobjdesc^.parent;
    end; (*while*)

identifyobject := objdesc;
end;
```

What is claimed is:

1. In a computer system operated by a user, a method for providing context-sensitive help text independent of help provided with an application program, the computer system including a processor, memory, a user input device and a display screen, wherein the computer system executes an operating system and the application program, and wherein the display screen displays at least one image corresponding to an object which is part of the application program, the method comprising the steps of:

identifying at least one characteristic of an object which is part of the application program;

storing references to the at least one characteristic and the object on a list of objects;

accepting selection input from the user, wherein a selection input is an input from the user input device which selects an image on the display screen;

if the accepted selection input corresponds to a predefined selection input, intercepting the selection input using a help monitor;

comparing a reference to a characteristic of the selected image to characteristics in the list of objects, to find a matching object reference in the list of objects;

if a match is found, locating context-sensitive help text associated in the list of objects with the matching object reference, the step of locating context-sensitive help text performed without the use of a predetermined pointer, if provided to help text provided by the application; and displaying the context-sensitive help text on the display screen, the context-sensitive help text being independent of help text provided as part of the application program.

2. The method of claim 1, wherein a child object is associated with a parent object, wherein the characteristics of both the child and parent objects are parameters of a first agent that is included in a communication exchanged between the operating system and the application program when the child object is selected by the user according to the predetermined manner, wherein the memory includes a list and the list includes a reference to the first agent and an association of the first agent with the first help text, the method further including the following steps executed by the processor:

intercepting a communication between the operating system and the application program where the communication contains a reference to an agent;

checking whether the agent in the intercepted communication matches the first agent in the list; and if the agent matches the first agent in the list, displaying, in response to the determining step, the first help text on the display screen.

3. The method of claim 1, wherein multiple instances of a single application program are executing on the computer system, the method further comprising the steps of:

loading each instance of the application program thereby obtaining a different handle for each instance; and using the different handle to determine which instance an object is associated with.

4. The method of claim 1, wherein multiple instances of a single application program are executing on the computer system, wherein each instance of the application program includes a reference to a title bar specific to the instance, wherein a title bar is used as a visual label for an instance and a first instance's title bar is different from a second instance's title bar, the method further comprising the steps of:

storing an indication of the title bars of the first and second instances; and using the title bars to determine which instance an object is associated with.

5. The method of claim 1, further comprising the step os of:

intercepting user input;

determining if the user input is a help request, based on invocation-invariant characteristics; and if the user input is not a help request, passing the user input to the application program, otherwise processing the user input as a help request.

6. A method for uniquely identifying an object in a windows environment in a computer system wherein the windowing operating system does not uniquely identify objects with identifiers which are both accessible to end users and invariant across invocations, the computer system including a memory coupled to a processor which is displayed on a display controlled by a computer system executing a windowing operation, the method comprising the steps of:

testing an object to determine one or more characteristics which are invocation-invariant, an invocation-invariant characteristic being a characteristic of an object which is constant from invocation to invocation of the object; and storing a list of object handles and the one or more characteristics for objects referenced by the list.

7. The method of claim 6, wherein one of the characteristics is the object's title.

8. The method of claim 6, wherein one of the characteristics is the object's class.

9. The method of claim 6, wherein one of the characteristics is the object's identification number.

10. The method of claim 6, wherein one of the characteristics is a number of parent objects for the object.

11. The method of claim 6, wherein one of the characteristics is a number of child objects for the object.

12. The method of claim 6, further comprising the steps of:

keeping a record of list zones within a given object, a list zone being a display zone where the given object might place a listing; and using the record of list zones to identify a list zone within the given object as a separate object.

13. The method of claim 6, further comprising the steps of:

keeping a record of menu item names within a given menu object; and using the record of menu item names within the given menu object to identify a menu item as a separate object.

14. The method of claim 6, further comprising the steps of:

selecting a predetermined number of characteristics of a third object for later identification;

determining whether the predetermined number of characteristics uniquely distinguishes the third object from the characteristics of the first object;

if the third object is not uniquely distinguished, selecting additional characteristics of the third object; and storing the predetermined number of characteristics and the additional characteristics of the third object as a unique identifier of the third object.

15. A method for controlling an application program, the method executing on a computer system, the computer system including a processor and memory, the computer system executing a windowing operating system which provides a handle for each object in the application program executed by the windowing operating system, the method comprising the steps of:

creating a script file in the memory, wherein the script contains instructions which specify predetermined actions to be performed on at least one object in the application program;

loading the application program into memory for execution under the windowing operating system;

executing the script file to perform the predetermined actions on the at least one object in the application program;

generating a handle to an object in the script file by matching the script file objects' invocation-invariant characteristics with the characteristics of objects in the application program;

obtaining the matched application program object's handle from the windowing operating system; and using the handle to send a communication to the windowing operating system so that the predetermined action is performed on the object.

16. A method for adding functionality to an application program while allowing the application program to be executed by invoking an original name of the application program, the method utilizing a computer system, the computer system including a processor, memory, the application program, a script file specifying actions to be performed on objects within the application program to add functionality to the application program and a script program for executing script files, the method comprising the following steps executed by the processor:

renaming the application program to a new application name;

renaming the script program to the original name of the application program, such that the computer system will invoke the script program with the same command line as would have been used to invoke the application program;

beginning execution of the script program;

determining whether the script program has been renamed;

if the script program has been renamed, executing the one or more instructions in the script file to begin execution of the application program by invoking the application program using its new application name; and during the execution of the application program, upon the occurrence of a predetermined event, using the script program to execute the script file to add functionality to the application program.

\* \* \* \* \*